US011756165B2

(12) United States Patent
Kaneko et al.

(10) Patent No.: US 11,756,165 B2
(45) Date of Patent: Sep. 12, 2023

(54) IMAGE PROCESSING APPARATUS, METHOD, AND STORAGE MEDIUM FOR ADDING A GLOSS

(71) Applicant: CANON KABUSHIKI KAISHA, Tokyo (JP)

(72) Inventors: Chiaki Kaneko, Yokohama (JP); Daiki Nakagawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/854,031

(22) Filed: Jun. 30, 2022

(65) Prior Publication Data

US 2022/0335575 A1    Oct. 20, 2022

Related U.S. Application Data

(62) Division of application No. 17/086,674, filed on Nov. 2, 2020, now Pat. No. 11,423,515.

(30) Foreign Application Priority Data

| Nov. 6, 2019 | (JP) | 2019-201585 |
| Nov. 14, 2019 | (JP) | 2019-206348 |
| Nov. 22, 2019 | (JP) | 2019-211710 |

(51) Int. Cl.
*G06K 9/00* (2022.01)
*G06T 5/00* (2006.01)
(Continued)

(52) U.S. Cl.
CPC .............. *G06T 5/002* (2013.01); *G06T 5/008* (2013.01); *G06T 7/50* (2017.01); *G06T 7/60* (2013.01);
(Continued)

(58) Field of Classification Search
CPC ........... G06T 5/002; G06T 5/008; G06T 7/50; G06T 7/60; G06T 7/70;
(Continued)

(56) References Cited

U.S. PATENT DOCUMENTS

| 5,404,426 A | 4/1995 | Usami |
| 5,539,541 A | 7/1996 | Ushida |

(Continued)

FOREIGN PATENT DOCUMENTS

| CN | 102959581 A | 3/2013 |
| CN | 101710415 B | 11/2014 |

(Continued)

OTHER PUBLICATIONS

Detection and Analysis of Hair. Yaser Yacoob et al., IEEE, Jul. 2006, pp. 1164-1169 (Year: 2006).*

(Continued)

*Primary Examiner* — Jayesh A Patel
(74) *Attorney, Agent, or Firm* — Carter, DeLuca & Farrell LLP

(57) ABSTRACT

The technique of the present disclosure can add a gloss to image data according to the hair flow of a subject. An image data obtaining unit obtains input image data, and a characteristic amount calculating unit calculates characteristic amounts for the input image data. The characteristic amount calculating unit obtains a degree to which directions of hair flow are concentrated to a predetermined direction (a degree of alignment) in a predetermined range based on the directions of hair flow, and sets this as a characteristic amount indicative of the degree of alignment of the directions of hair flow. A determining unit estimates the state of the hair flow of the entire input image data based on the characteristic amounts thus calculated, and determines whether to correct (Continued)

the input image data. A correcting unit performs a gloss adding correction to the input image data.

17 Claims, 23 Drawing Sheets

(51) Int. Cl.
*G06T 7/70* (2017.01)
*G06T 7/60* (2017.01)
*G06T 7/50* (2017.01)

(52) U.S. Cl.
CPC ...... *G06T 7/70* (2017.01); *G06T 2207/30196* (2013.01)

(58) Field of Classification Search
CPC ......... G06T 2207/30196; G06T 15/506; G06T 19/20; G06T 2219/2012; G06T 7/73
See application file for complete search history.

(56) References Cited

U.S. PATENT DOCUMENTS

| | | |
|---|---|---|
| 7,068,835 B1 | 6/2006 | Ban et al. |
| 7,289,667 B2 | 10/2007 | Nenonen et al. |
| 7,983,511 B1 | 7/2011 | Chan |
| 8,625,923 B2 | 1/2014 | Utsugi |
| 9,053,552 B2 | 6/2015 | Sasaki et al. |
| 9,536,172 B2 | 1/2017 | Kaneko |
| 11,423,515 B2 * | 8/2022 | Kaneko ............... G06T 7/70 |
| 2005/0075557 A1 | 4/2005 | Kamiyama |
| 2005/0244075 A1 | 11/2005 | Shaked et al. |
| 2008/0037898 A1 | 2/2008 | Nakagata et al. |
| 2010/0026717 A1 | 2/2010 | Sato |
| 2010/0239173 A1 | 9/2010 | Yamada et al. |
| 2012/0063662 A1 | 3/2012 | Kwon et al. |
| 2012/0320191 A1 * | 12/2012 | Meschkat ............... G01N 21/84 348/135 |
| 2014/0022249 A1 | 1/2014 | Ye |
| 2014/0064613 A1 | 3/2014 | Wu et al. |
| 2014/0226902 A1 | 8/2014 | Yamaguchi |
| 2014/0341350 A1 | 11/2014 | Muroi et al. |
| 2015/0063726 A1 | 3/2015 | Matsumoto |
| 2015/0217465 A1 | 8/2015 | Krenik |
| 2015/0292871 A1 | 10/2015 | Kaneko |
| 2016/0071316 A1 * | 3/2016 | Beeler ............... G06T 17/20 345/423 |
| 2016/0078675 A1 * | 3/2016 | Bowline ............... G06T 13/40 345/423 |
| 2018/0089850 A1 | 3/2018 | Iwao |
| 2019/0378246 A1 | 12/2019 | Prentice et al. |
| 2020/0249161 A1 * | 8/2020 | Mueller ............... A45D 44/00 |

FOREIGN PATENT DOCUMENTS

| | | | |
|---|---|---|---|
| CN | 105844706 B | 8/2018 | |
| EP | 1058209 A2 | 12/2000 | |
| EP | 2124185 A1 * | 11/2009 | ........... A45D 44/005 |
| EP | 2124185 A1 | 11/2009 | |
| GB | 2408888 A | 6/2005 | |
| JP | 2000339498 A | 12/2000 | |
| JP | 2000339498 A * | 12/2000 | |
| JP | 2001209799 A | 8/2001 | |
| JP | 2002150287 A | 5/2002 | |
| JP | 2013-026669 A | 2/2013 | |
| JP | 2013-058164 A | 3/2013 | |
| JP | 2013058164 A * | 3/2013 | |
| WO | 0237835 A2 | 5/2002 | |
| WO | WO-2008093735 A1 * | 8/2008 | ............ A45D 44/00 |
| WO | 2012093348 A1 | 7/2012 | |
| WO | 2012127904 A1 | 9/2012 | |

OTHER PUBLICATIONS

Interactive rendering of optical effects in the wet hair, Rajeev Gupta et al., ACM, 2007, pp. 133-140 (Year: 2007).*
Analysis of Hair Shine—Evaluation, Girish Ramesh et al., ACM, 2018, pp. 25:1-25:17 (Year: 2018).*
Paris, S. et al., "Capture of Hair Geometry from Multiple Images" ACM (Aug. 2004) pp. 712-719.
Yacoob, Y. et al., "Detection and Analysis of Hair" IEEE Transactions on Pattern Analysis and Machine Intelligence (Jul. 2006) pp. 1164-1169, vol. 28, No. 7.
Marschner, S. R. et al., "Light Scattering from Human Hair Fibers" ACM (Jul. 2003) pp. 780-791.
Ward, K. et al., "A Survey on Hair Modeling: Styling, Simulation, and Rendering" IEEE Transactions on Visualization and Computer Graphics (Mar./Apr. 2007) pp. 213-234, vol. 13, No. 2.
Ramesh, G. et al., "Analysis of Hair Shine Using Rendering and Subjective Evaluation" ACM Trans. Appln. Percept. (Oct. 2018) pp. 1-17, vol. 15, No. 4, article 25.
Gupta, R. et al., "Interactive Rendering of Optical Effects in Wet Hair" VRST (Nov. 2007) pp. 133-140.
Laput, G. et al., "3D Printed Hair: Fused Deposition of Modeling of Soft Strands, Fibers and Bristles" ACM (Nov. 2015) pp. 593-597.
Yosuke Nagasaka et al., "A Method for Noise Suppression in Image Morphing Using Co-occurrence Frequency Image," IEEE, 2011, pp. 630-634.
Niloofar Amani et al., "A New Approach for Face Image Enhancement and Recognition," IJOAST, Mar. 2013, pp. 1-10.
Notice of Allowance dated Jan. 11, 2023 issued in U.S. Appl. No. 17/854,040.

* cited by examiner

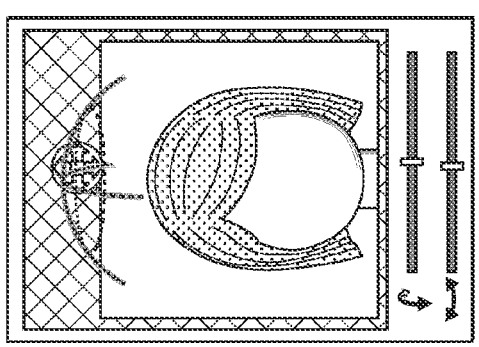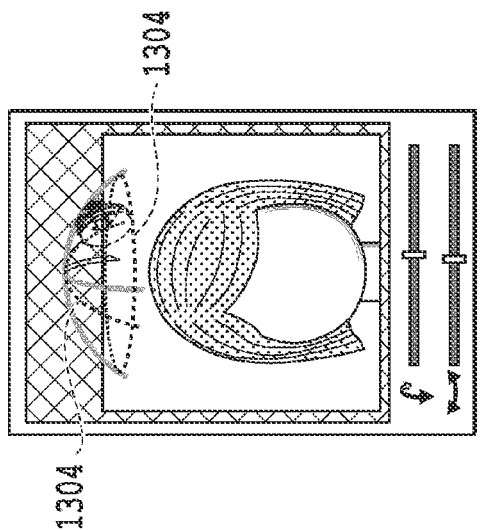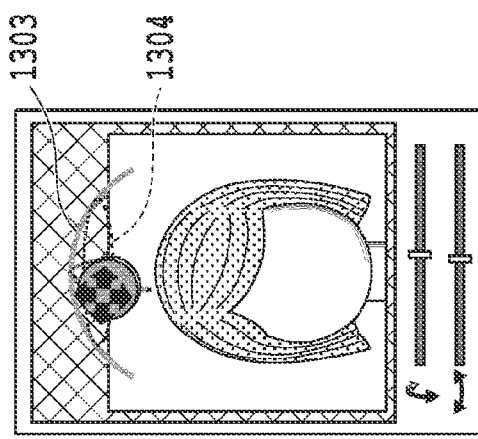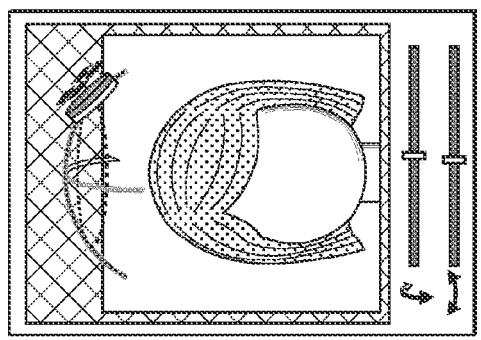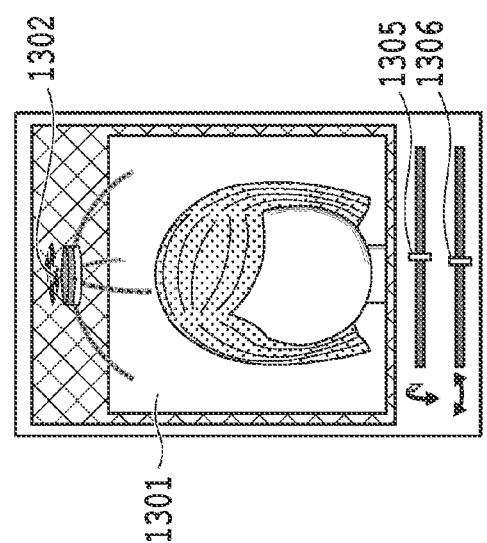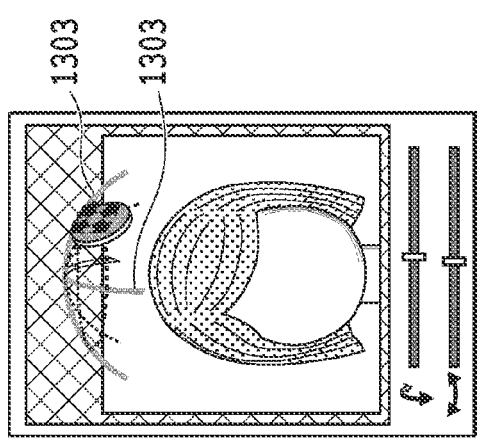
FIG.13A  FIG.13B  FIG.13C
FIG.13D  FIG.13E  FIG.13F

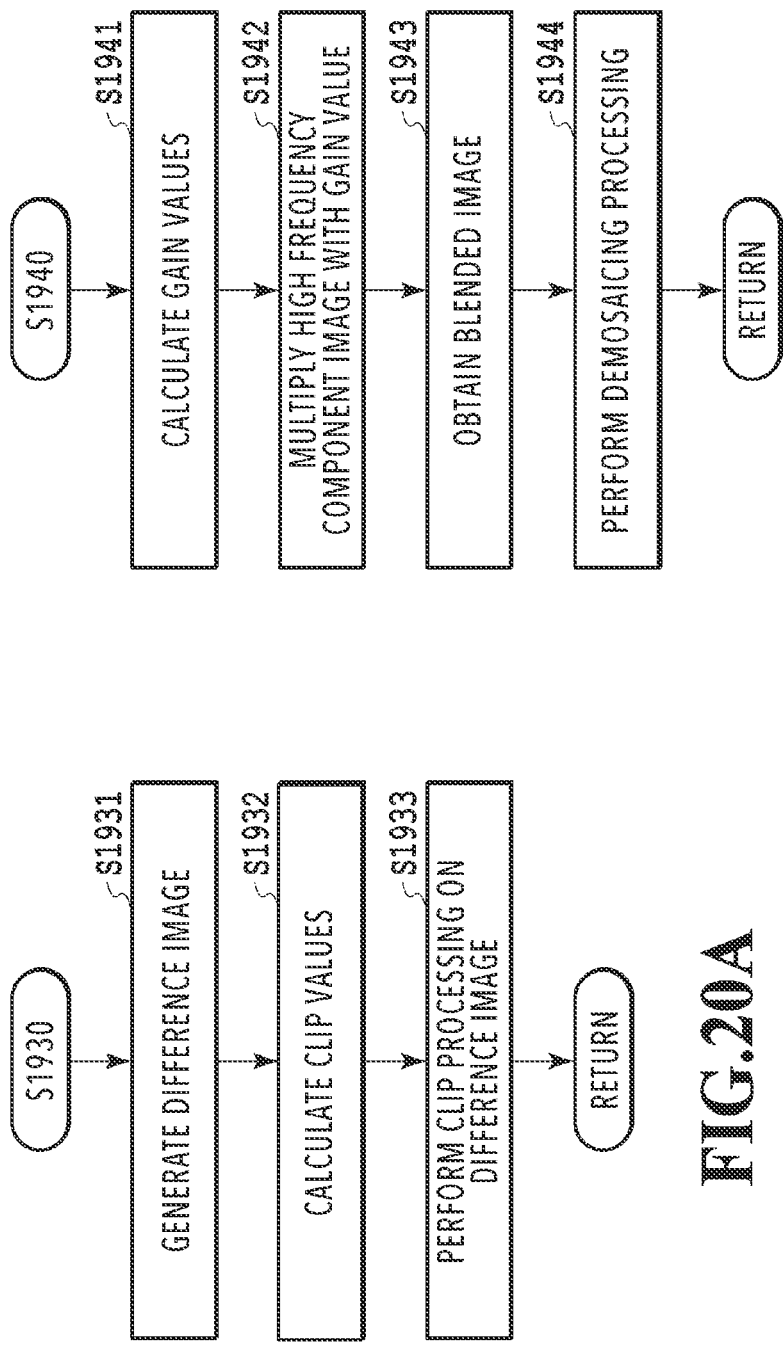

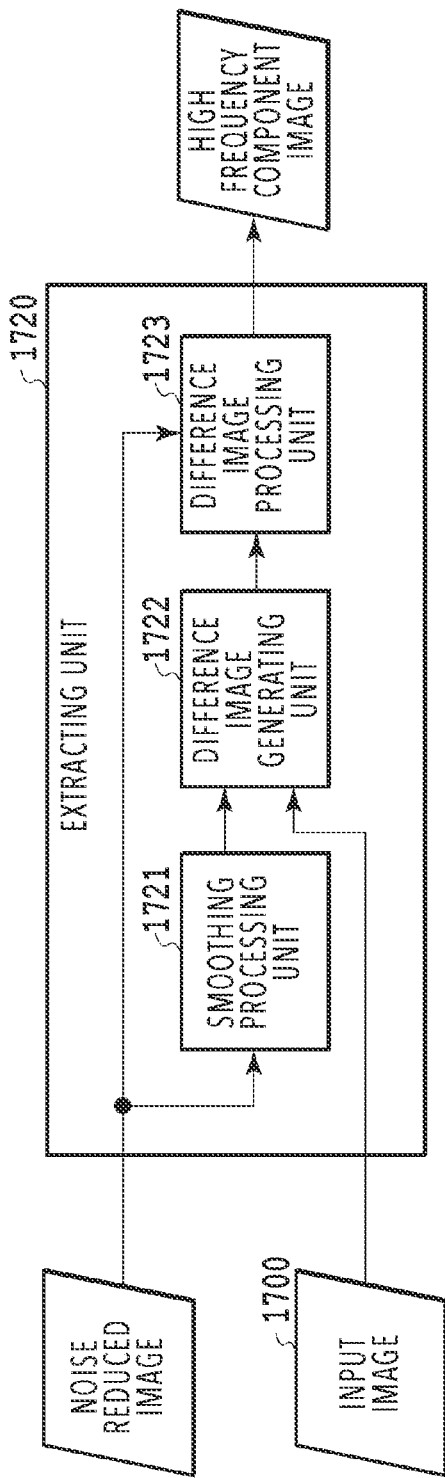
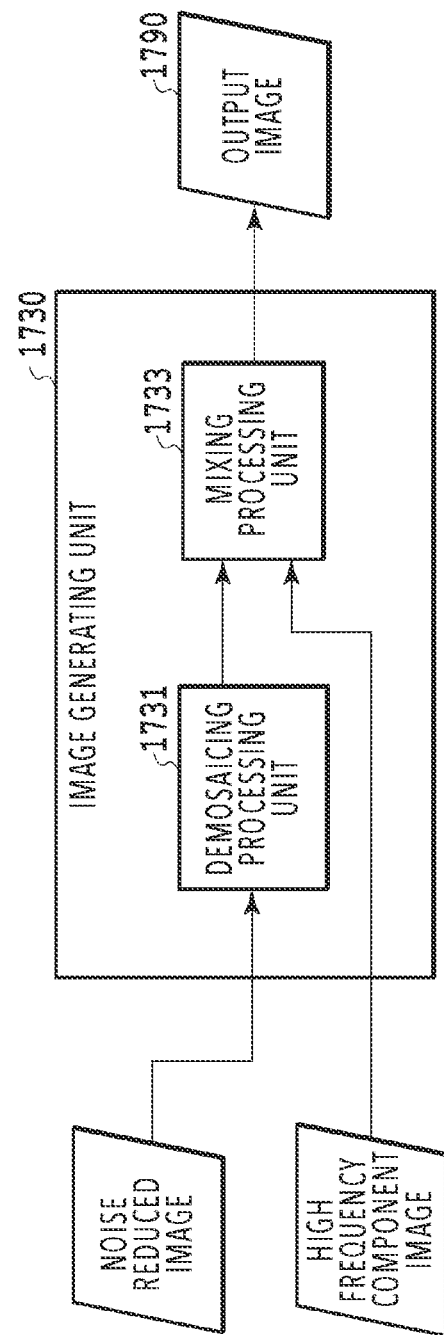
FIG.21A
FIG.21B

IMAGE PROCESSING APPARATUS, METHOD, AND STORAGE MEDIUM FOR ADDING A GLOSS

CROSS REFERENCE TO RELATED APPLICATIONS

This application is a divisional of U.S. patent application Ser. No. 17/086,674, filed on Nov. 2, 2020, which claims the benefit of and priority to Japanese Patent Application No. 2019-211710, filed on Nov. 22, 2019; Japanese Patent Application No. 2019-206348, filed on Nov. 14, 2019; and Japanese Patent Application No. 2019-201585, filed on Nov. 6, 2019, each of which is hereby incorporated by reference herein in their entirety.

BACKGROUND OF THE INVENTION

Field of the Invention

The technique of the present disclosure relates to a technique for image processing performed to adjust a gloss on a subject in an image and for noise reduction processing performed on the image.

Description of the Related Art

In order to add a gloss to hair on the head of a person in a captured image through image processing, there has conventionally been known a technique for detecting a bright part in a region containing the hair on the head (a hair region) and performing image correction according to the detection results (Japanese Patent Laid-Open No. 2013-58164 (Patent Literature 1). This technique aims to automatically add a favorable gloss to the hair region by performing image correction to brighten up a part of the hair region in a case where no bright part is detected from the hair region.

In general, in a case where the flow of hair (hereinafter also referred to as hair flow) is uniform, the orientations of light beams reflected by individual hairs are similar to one another, making a gloss on the hair on the head appear intensely and clearly. By contrast, in a case where the hair flow is not uniform, the orientations of light beams reflected by individual hairs vary, making a gloss on the hair appear weakly and blurry. In other words, a gloss on hair appears differently depending on the state of the hair flow. However, the conventional technique has the problem of not taking the state of the hair flow into account in adding a gloss, and therefore adding a gloss unnaturally in a case where the hair has irregular hair flow and is unlikely to have a gloss in actuality.

SUMMARY OF THE INVENTION

The technique of the present disclosure is an image processing apparatus comprising: calculating unit configured to calculate characteristic amounts each indicative of a degree of alignment of directions of hair flow of a subject contained in image data; and correcting unit configured to correct the image data so as to change a gloss on the subject according to the characteristic amounts.

Further features of the present invention will become apparent from the following description of exemplary embodiments with reference to the attached drawings.

BRIEF DESCRIPTION OF THE DRAWINGS

FIG. 13A is a diagram showing an example UI;

FIG. 13B is a diagram showing an example UI;

FIG. 13C is a diagram showing an example UI;

FIG. 13D is a diagram showing an example UI;

FIG. 13E is a diagram showing an example UI;

FIG. 13F is a diagram showing an example UI;

FIG. 20A is a flowchart of an image processing method according to one embodiment;

FIG. 20B is a flowchart of an image processing method according to one embodiment;

FIG. 21A is a diagram showing an example functional configuration of an image processing apparatus according to one embodiment;

FIG. 21B is a diagram showing an example functional configuration of an image processing apparatus according to one embodiment;

DESCRIPTION OF THE EMBODIMENTS

Figure 1:
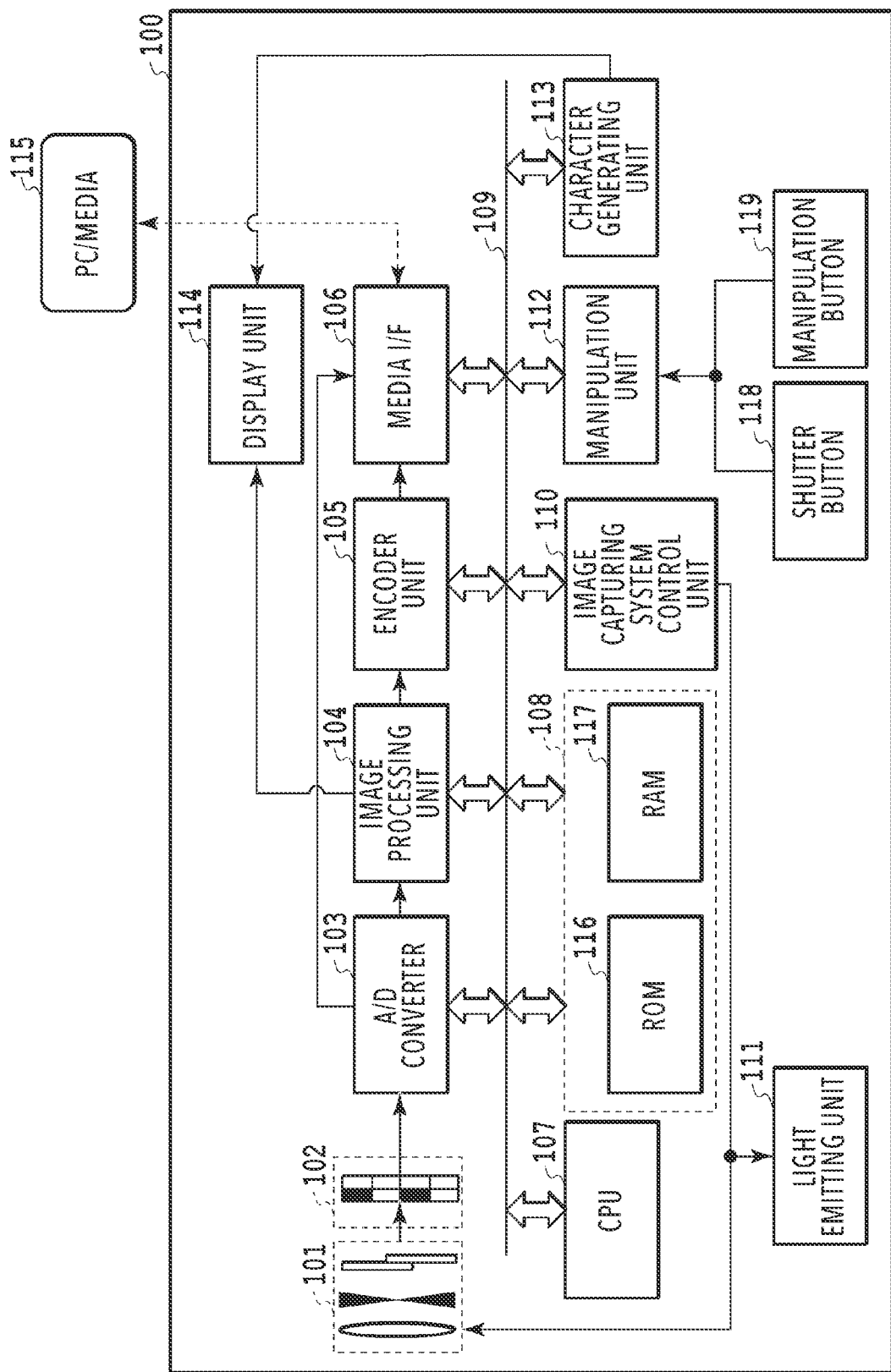
FIG. 1 is a diagram showing the hardware configuration of an image processing apparatus according to one embodiment.

Embodiments of the present disclosure will be described below with reference to the drawings. Note that the following embodiments are not intended to limit the technique of the present disclosure, and not all the combinations of features described in the embodiments herein are necessarily essential to the solving means of the present disclosure. Note that the same configurations are described by being denoted by the same reference numeral. The following describes a case of adding a gloss to hair on the head, but the technique of the present disclosure is also applicable to giving a gloss to any hair. Further, herein, "hair" is not limited to the hair of a living being, but includes an artificial matter such as yarn.

Embodiment 1

The present embodiment calculates characteristic amounts indicating the characteristics of hair flow from a captured image, estimates based on the characteristic amounts whether the hair flow is regular, and performs gloss-adding correction on the captured image only if the hair flow is regular.

FIG. 1 is a diagram showing an example hardware configuration of an image processing apparatus of the present embodiment. The image processing apparatus shown in FIG. 1 is an image processing unit 104 mounted in an image capturing apparatus 100 such as a digital camera. The image capturing apparatus 100 includes an optical unit 101, an image sensor unit 102, an A/D converter 103, the image processing unit 104, an encoder unit 105, and a media interface (I/F) 106. The image capturing apparatus 100 also includes a CPU 107, a memory unit 108, a system bus 109, an image capturing system control unit 110, a light emitting unit 111, a manipulation unit 112, a character generation unit 113, a display unit 114, and the like.

The optical unit 101 is a lens barrel configured with a zoom lens, a focus lens, a shake correction lens, an aperture, and a shutter, and collects and condenses light information on a subject.

The image sensor unit 102 includes an image sensor and a color filter with a predetermined arrangement such as the Bayer arrangement. In the image sensor unit 102, the image sensor receives a beam of light focused by the optical unit 101 through the color filter, thereby converting the light into analog electric signals containing color information on the subject.

The A/D converter 103 converts the analog electric signals outputted from the image sensor unit 102 into digital signals, thereby generating RAW image data.

The image processing unit 104 performs development processing on the RAW image data generated by the A/D converter 103, thereby generating color image data. Further, the image processing unit 104 performs various kinds of image processing on the color image data, including white balance (WB) correction processing. A detailed description of the internal configuration of the image processing unit 104 will be given later. During the image processing, the image processing unit 104 stores the image data in the memory unit 108 and reads the image data if necessary.

The encoder unit 105 is a processing circuit that compresses various kinds of data processed by the image processing unit 104 and converts them to a file format such as JPEG. Although the image capturing apparatus 100 has the encoder unit 105 in the present embodiment as an example, the image capturing apparatus 100 may be without the encoder unit 105. In a case where the image capturing apparatus 100 is without the encoder unit 105, the various kinds of data are outputted uncompressed, in a format such as TIFF.

The media I/F 106 is an interface for sending and receiving image data to and from a PC/media 115 (e.g., a storage device or a storage medium, such as an HDD or an SSD, a memory card, a CF card, or an SD card). For example, a Universal Serial Bus (USB) may be used as the media I/F 106.

The CPU 107 is involved in the processing by all the units. The CPU 107 sequentially reads instructions stored in the memory unit 108, which is configured with a ROM 116 and a RAM 117, interprets the instructions, and executes processing according to the interpretation results.

The system bus 109 is a bus for sending and receiving data between the units connected.

The image capturing system control unit 110 is a control circuit that controls the optical unit 101, such as its focusing, opening the shutter, and adjusting the aperture.

The light emitting unit 111 is an auxiliary light source for emitting auxiliary light to assist illumination in image capturing. The auxiliary light source may be a strobe light incorporated in the camera or an external strobe light. The light emitting operation of the light emitting unit 111, such as causing the strobe light to flash or not flash, is controlled by the image capturing system control unit 110.

The manipulation unit 112 receives a signal from a shutter button 118 or a manipulation button 119, and communicates a user instruction, such as capturing an image or a change to the camera settings, to the CPU 107.

The character generation unit 113 is a processing circuit that generates characters, a graphic, and the like. Characters or a graphic generated by the character generation unit 113 is superimposed on various kinds of image data and displayed on the display unit 114.

The display unit 114 is a liquid crystal display or the like that displays various kinds of image data and a camera settings menu.

Figure 2:
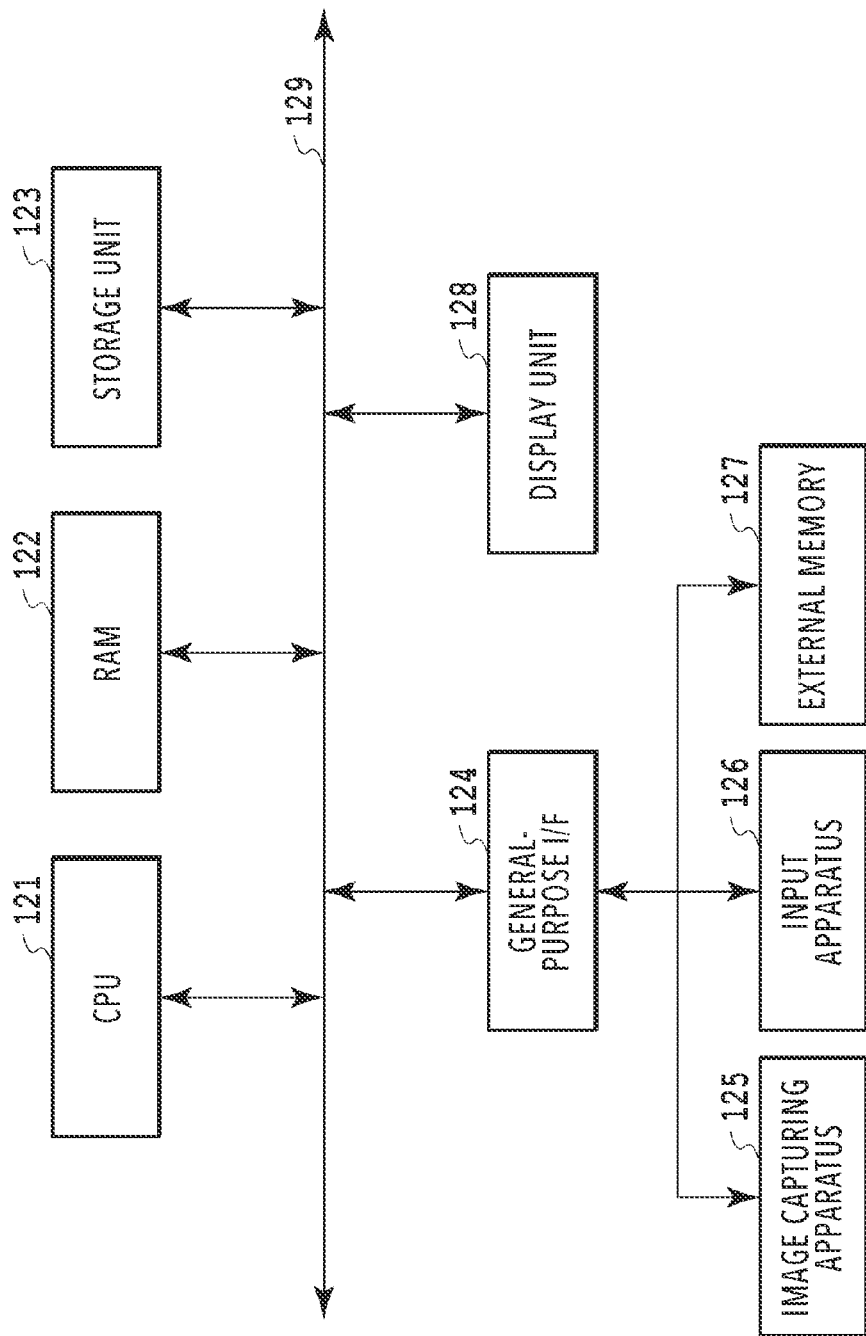
FIG. 2 is a diagram showing an example hardware configuration of an image processing apparatus according to one embodiment.

Note that the hardware configuration of the image processing apparatus may be such that an image processing apparatus like the one shown in FIG. 2 is configured separately from the image capturing apparatus 100. The image processing apparatus shown in FIG. 2 has a CPU 121, a RAM 122, a storage unit 123, a general-purpose interface (I/F) 124, and a display unit 128. These units are connected to one another via a main bus 129. Further, an image capturing apparatus 125, an input apparatus 126, and an external memory 127 are connected to the image processing apparatus via the general-purpose interface 124.

The CPU 121 controls the units according to an image inputted and programs for implementing the processing to be described later. The storage unit 123 is a storage medium such as an HDD or an SSD. The storage unit 123 stores computer programs for the CPU 121 to execute various kinds of processing. The RAM 122 may serve as buffer memory to temporarily store inputted image data and the like, or as the workspace of the CPU 121. A processor like the CPU 121 interprets and executes the programs stored in memory like the RAM 122 or the storage unit 123 and performs operations based on the instructions, thereby implementing the functions of the units to be described later.

The image capturing apparatus 125 is an apparatus that captures images, such as a camera or a 3D scanner, and is capable of inputting an obtained captured image to the image processing apparatus. The input apparatus 126 is an apparatus for receiving an instruction or data, and may be, for example, a mouse or a keyboard used by a user to give an instruction to the image processing apparatus. The external memory 127 is a storage medium that stores data, such as, for example, a memory card. The display unit 128 is a hardware component with an information displaying function, and may be, for example, a liquid crystal display or an organic electroluminescent (EL) display. The display unit 128 can display images and can also display a user interface (UI) for a user to input a desired instruction. The image processing apparatus of the present embodiment can perform the processing to be described later on an image stored in the RAM 122, according to the instructions made by a user through the user interface and the input apparatus 126.

As described above, some or all of the functions of the image processing apparatus according to one embodiment of the present invention may be implemented by dedicated hardware, or may be implemented by a computer which is an information processing apparatus. Further, the image processing apparatus according to one embodiment of the present invention may be configured with a plurality of information processing apparatuses connected to one another via, for example, a network. An image after noise reduction processing obtained by the processing to be described later is stored back in the RAM 122. The image after noise reduction processing stored in the RAM 122 can be outputted to the display unit 128 or the external memory 127, as instructed by the user.

Figure 3:
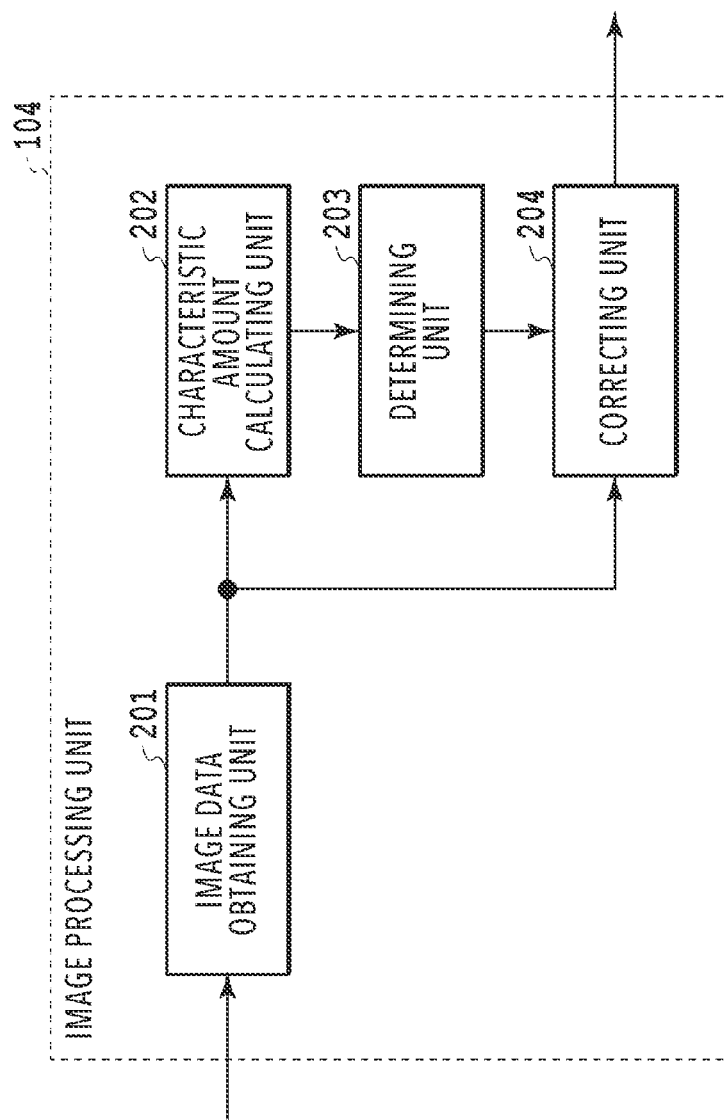
FIG. 3 is a functional block diagram of an image processing unit according to one embodiment.

FIG. 3 is a block diagram showing the software configuration of the image processing unit 104 of the present embodiment.

An image data obtaining unit 201 reads RAW image data obtained by capturing an image of a subject from the memory unit 108, and generates color image data (hereinafter referred to as input image data) I by performing processing such as demosaicing and noise reduction on the RAW image data. The thus-generated input image data I is sent to a characteristic amount calculating unit 202 and a correcting unit 204.

Note that the "RAW image data obtained by capturing an image of a subject" is image data on an image captured by the image sensor unit 102 and outputted from the A/D converter 103 to the memory unit 108. For example, the RAW image data is obtained by the image capturing apparatus 100 capturing an image in the following way. In the image capturing apparatus 100 of the present embodiment, while the shutter button 118 is not manipulated, the image capturing system control unit 110 controls the optical unit 101 and the image sensor unit 102 to capture images for what is called live view display at every predetermined frame period. If the shutter button 118 is pushed halfway down, the image capturing system control unit 110 controls the optical unit 101 to do auto-focus (AF) lock and auto-exposure (AE) lock. Here, AF lock is a control to lock the focal length during autofocus which drives the focus lens in the optical unit 101. AE lock is a control to lock the exposure value during auto-exposure. Thereafter, once the shutter button 118 is pushed all the way down, the image capturing system control unit 110 controls the optical unit 101 and the image sensor unit 102 to perform full-scale exposure and actually capture an image of a subject. The image sensor unit 102 obtains analog electric signals by capturing an image of the subject and outputs the analog electric signals to the A/D converter 103, which then generates RAW image data based on the analog electric signals.

Note that a method for obtaining the input image data I is not limited to the method described above. For example, RAW image data prestored in the PC/media 115 may be retrieved to generate color image data. Alternatively, color image data stored in the memory unit 108 or the PC/media 115 may be retrieved and used as the input image data I as is.

The characteristic amount calculating unit 202 calculates characteristic amounts indicative of the characteristics of hair flow regarding the input image data I. In the present embodiment, for each pixel in the input image data I, the characteristic amount calculating unit 202 estimates the direction of hair flow using pixel values of neighboring pixels, and based on a distribution of the direction of hair flow, calculates a characteristic amount. Details will be given later. The characteristic amounts thus calculated are sent to a determining unit 203.

The determining unit 203 estimates the state of hair flow based on the characteristic amounts calculated by the characteristic amount calculating unit 202, and determines whether to correct the input image data I. Details will be given later. The determination result is sent to the correcting unit 204.

According to the determination result sent from the determining unit 203, the correcting unit 204 performs a gloss addition correction by changing a gloss in the input image data I. The correcting unit 204 outputs corrected image data as output image data I'. If it is determined not to perform correction, the correcting unit 204 outputs the input image data I as the output image data I' as is. Details of the correction will be given later. Lastly, the correcting unit 204 outputs the output image data I' to a later-stage processor, such as the encoder unit 105. Note that, before being outputted, the output image data I' may be subjected to color processing such as gamma.

Figure 4:
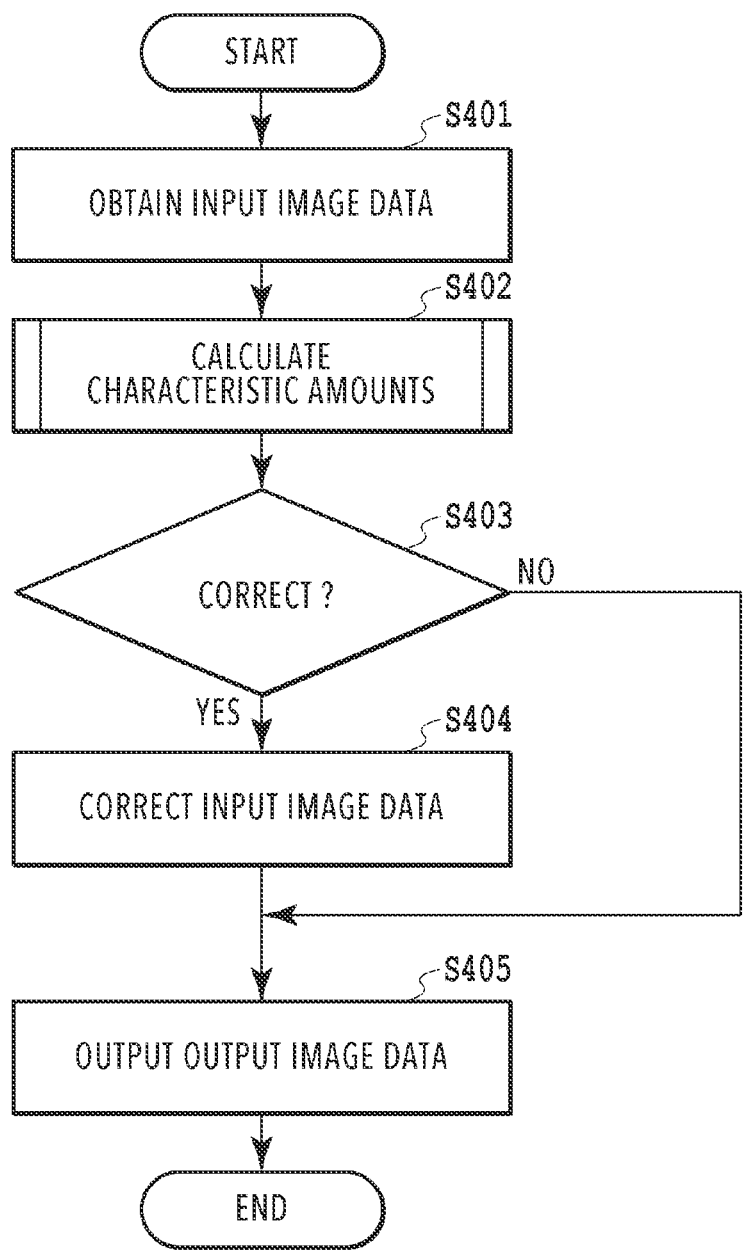
FIG. 4 is a flowchart showing the flow of a series of processing steps performed by an image processing apparatus according to one embodiment.

FIG. 4 is a flowchart showing an operating procedure of processing performed by the image processing unit 104. The following description gives details of each processing step.

In S401, the image data obtaining unit 201 obtains input image data I.

Figure 5:
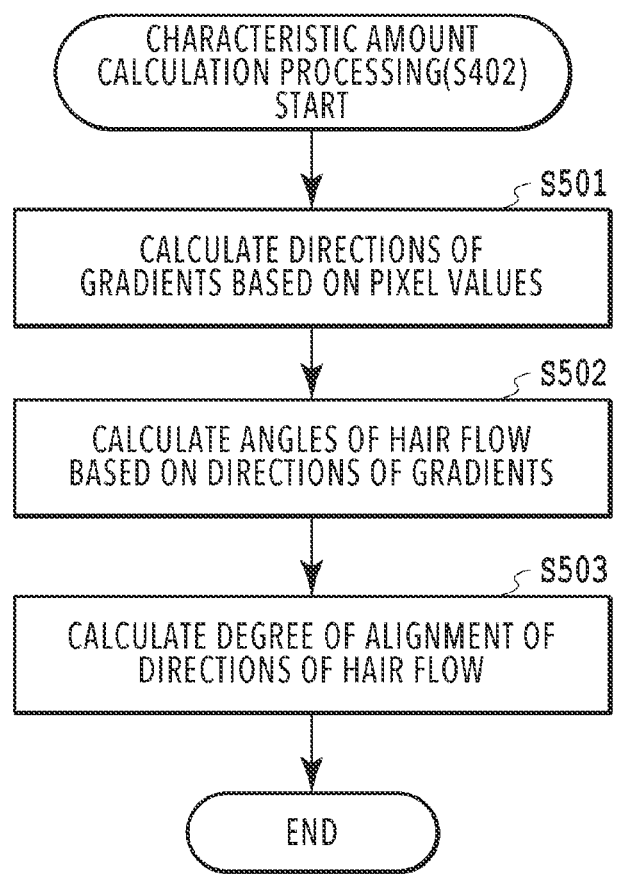
FIG. 5 is a flowchart showing the flow of characteristic amount calculation processing according to one embodiment.

In S402, the characteristic amount calculating unit 202 calculates characteristic amounts regarding the input image data I. In general, in a hair region, fine shadows are generated along the hair flow due to the unevenness formed by overlapping hairs. In the present embodiment, the direction of hair flow is estimated for each pixel based on the direction of the gradient of the brightness of the shadows. Further, based on the estimated directions of the hair flow, the degree to which the directions of hair flow are concentrated to a predetermined direction (the degree of alignment) is obtained for a predetermined area, and is used as a characteristic amount F indicating the degree of alignment of the directions of hair flow. Using the flowchart in FIG. 5, the following description will give details of characteristic amount calculation processing.

First, in S501, for a pixel of interest (i,j) in the input image data I, the characteristic amount calculating unit 202 calculates a gradient steepness S(i,j) and a gradient direction vector u(i,j) in accordance with the following formulae.

$$S(i,j)=\sqrt{S_i(i,j)^2+S_j(i,j)^2} \qquad (1)$$

$$u(i, j) = (u_i(i, j), u_j(i, j)) = \left(\frac{S_i(i, j)}{S(i, j)}, \frac{S_j(i, j)}{S(i, j)}\right) \qquad (2)$$

In the above formulae, $S_i(i,j)$ and $S_j(i,j)$ are output values from a first derivative filter about the lateral direction and the longitudinal direction of the image, respectively, and are calculated based on the following formulae using, for example, the publicly known Sobel filter.

$$S_i(i, j) = \frac{\sum_{i'=-N_s}^{N_s}\sum_{j'=-N_s}^{N_s}(Sobel_i(i', j')Y(i+i', j+j'))}{\sum_{i'=-N_s}^{N_s}\sum_{j'=-N_s}^{N_s}|Sobel_i(i', j')|} \qquad (3)$$

$$S_j(i, j) = \frac{\sum_{i'=-N_s}^{N_s}\sum_{j'=-N_s}^{N_s}(Sobel_j(i', j')Y(i+i', j+j'))}{\sum_{i'=-N_s}^{N_s}\sum_{j'=-N_s}^{N_s}|Sobel_j(i', j')|} \qquad (4)$$

In Formulae (3) and (4), Sobel$_i$(i',j') is a Sobel filter coefficient for the lateral direction, and Sobel$_j$(i',j') is a Sobel filter coefficient for the longitudinal direction. Further, in Formulae (3) and (4), $N_S$ is the number of pixels defining the filter size of the Sobel filter, and Y(i,j) is a luminance value obtained from RGB values IR(i,j), IG(i,j), and I$_B$(i,j) of the input image data I using a publicly known conversion formula. Note that the filter size may be, for example, $N_S$=3 for the input image data I on a close-up photo of a subject shot from the neck up, with a resolution of 1000×1000 or more pixels. In this case, the filter may have a 7×7 size with three pixels above and below the pixel of interest and three pixels to the right and to the left of the pixel of interest. Also, the filter size may be unfixed and changed according to the size of the hair region in the input image data I.

The clearer edge the image has, the larger value the gradient steepness S(i,j) in Formula (1) indicates. Further, the gradient direction vector u(i,j) in Formula 2 is a unit vector indicating the direction from darker pixels to brighter pixels.

Although the present embodiment uses a Sobel filter, other first derivative filters may be used. Also, although the luminance value Y is used in Formulae (3) and (4), other indices of brightness, such as lightness or a G channel value IG, may be used instead.

Next, in S502, the characteristic amount calculating unit 202 estimates an angle $\theta_{i,j}$ indicating the direction of hair flow at the pixel of interest (i,j) based on the gradient direction vector u(i,j). In the present embodiment, the angle $\theta_{i,j}$ of hair flow is the angle formed by a direction perpendicular to the gradient direction and the lateral direction of the input image data I (the i-axis direction of the pixel arrangement), and is calculated in accordance with the following formula.

$$\theta_{i,j} = \tan^{-1}\left(\frac{-u_i(i, j)}{u_j(i, j)}\right) \qquad (5)$$

Figure 6:
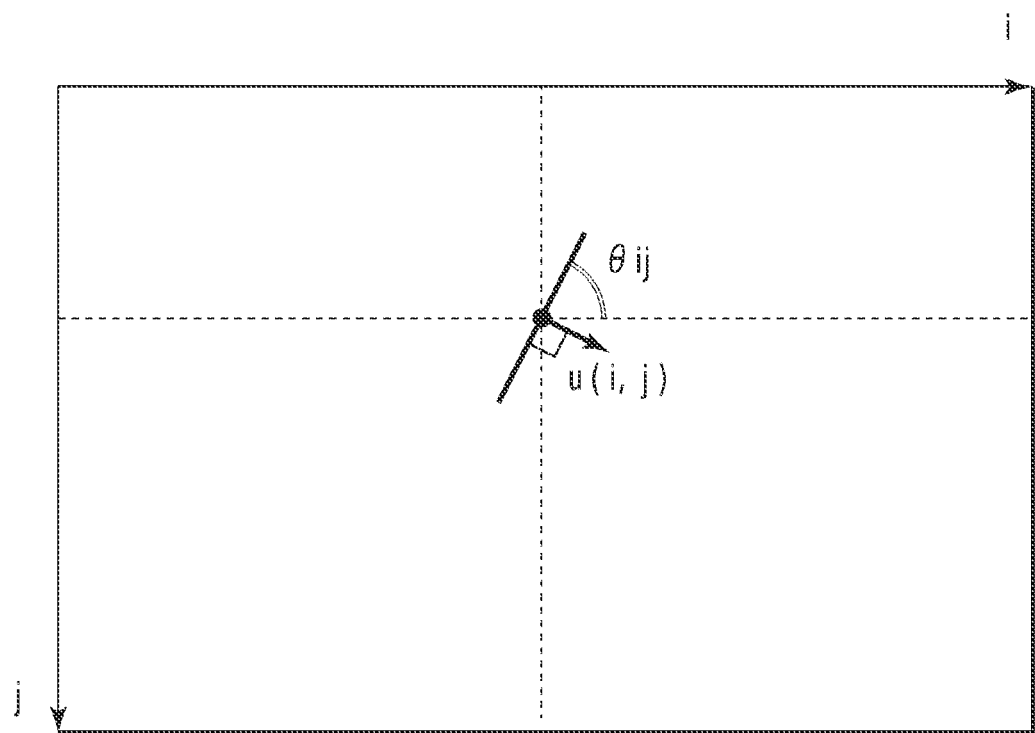
FIG. 6 is a diagram showing an example angle of hair flow.

FIG. 6 shows an example of the angle $\theta_{i,j}$. Note that in the present embodiment, the direction in which hair grows (the direction from the root of a hair to the tip of the hair) does not matter regarding the angle of hair flow. In other words, $\theta_{i,j}=\alpha$ and $\theta_{i,j}=\alpha+\pi$ are handled as the same angle without any distinction.

Next, in S503, as a characteristic amount F(i,j) of the pixel of interest (i,j) in the input image data I, the characteristic amount calculating unit 202 calculates a degree to which the angles θ of hair flow of neighboring pixels of the pixel of interest (i,j) concentrate to the vicinity of the angle $\theta_{i,j}$ (a degree of alignment of the directions of hair flow) in accordance with the following formulae.

$$F(i,j)=\sqrt{v_i(i,j)^2+v_j(i,j)^2} \qquad (6)$$

$$v_i(i, j) = \frac{\sum_{i'=-N_a}^{N_a}\sum_{j'=-N_a}^{N_a}\left(S(i+i', j+j')*\cos 2\theta_{i+i',j+j'}\right)}{\sum_{i'=-N_a}^{N_a}\sum_{j'=-N_a}^{N_a}S(i+i', j+j')} \qquad (7)$$

$$v_j(i, j) = \frac{\sum_{i'=-N_a}^{N_a}\sum_{j'=-N_a}^{N_a}\left(S(i+i', j+j')*\sin 2\theta_{i+i',j+j'}\right)}{\sum_{i'=-N_a}^{N_a}\sum_{j'=-N_a}^{N_a}S(i+i', j+j')} \qquad (8)$$

The characteristic amount F(i,j) corresponds to the length of a vector $(v_i, v_j)$. The vector $(v_i, v_j)$ corresponds to a weighted average resultant vector of a unit vector (cos $2\theta_{i,j}$, sin $2\theta_{i,j}$) having the double angle of the angle $\theta_{i,j}$. This is because no distinction is made between $\theta_{i,j}=\alpha$ and $\theta_{i,j}=\alpha+\pi$, as described earlier. Further, $N_a$ is the number of pixels defining the filter size for obtaining an average, and for example, $N_a=N_S$.

Here, the characteristic amount F(i,j) represents how close an angle $\theta_{ave}=\tan^{-1}(v_j/v_i)/2$ determined based on the weighted average resultant vector $(v_i, v_j)$ is to the angle $\theta_{i,j}$ of hair flow at the pixel of interest (i,j). The more the number of pixels having an angle of hair flow close to the angle $\theta_{i,j}$ of hair flow of the pixel of interest (i,j), meaning that the angles of hair flow are similar near the pixel of interest (i,j) (the hair flow is uniform), the larger the characteristic amount F(i,j). In a case where all the pixels in the filter have the same angle of hair flow, the characteristic amount F(i,j) shows the maximum value, which is 1.

Figure 7A:
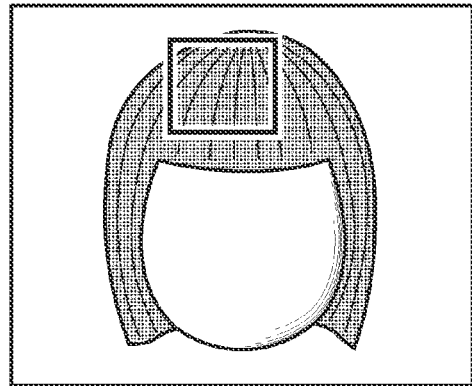
FIG. 7A is a diagram showing an example image of a subject.
Figure 7B:
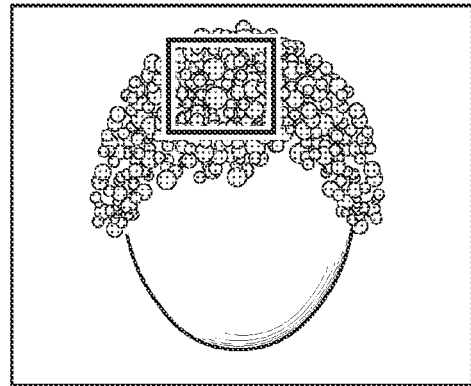
FIG. 7B is a diagram showing an example image of a subject.
Figure 7C:
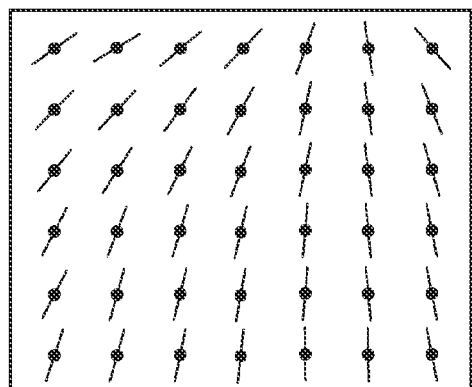
FIG. 7C is a diagram showing an example of hair flow.
Figure 7D:
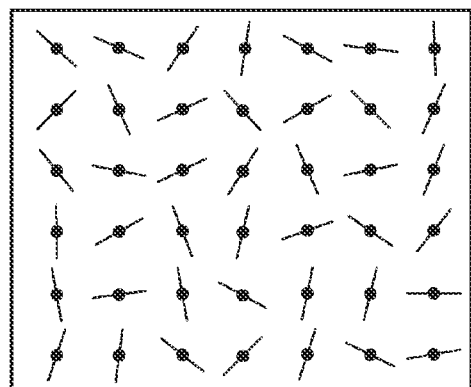
FIG. 7D is a diagram showing an example of hair flow.

FIG. 7A shows an example subject with uniform hair flow, and FIG. 7B shows an example subject with varying hair flow. FIGS. 7C and 7D show the distributions of the angles of hair flow of the respective pixels in the thick frames in FIGS. 7A and 7B, respectively. In FIGS. 7C and 7D, the angle of hair flow at each position indicated by a dot is represented by the slope of a line segment overlying the dot. In the example in FIG. 7C, the hair flow is virtually uniform longitudinally, therefore has a high degree of alignment. Thus, the characteristic amount F is a large value close to the maximum value 1. By contrast, in the example in FIG. 7D, the angles of hair flow vary, and therefore the degree of alignment is low. Thus, the characteristic amount F is a small value close to 0, which is the minimum value.

In S403, the determining unit 203 estimates the state of hair flow of the entire input image data I based on the characteristic amounts F(i,j) calculated in S402, and determines whether to correct the input image data I. Specifically, the determining unit 203 obtains a representative value of the characteristic amounts F calculated for the respective pixels in the input image data I, by averaging the characteristic amounts F. Then, if the average value equals or exceeds a predetermined threshold, the determining unit 203 deems that the hair flow is uniform, determining to correct the input image data I. If the average value of the characteristic amounts F is below the predetermined threshold, the determining unit 203 deems that the hair flow is not uniform, determining not to correct the input image data I. The flowchart proceeds to S404 after determining to correct the input image data I, or proceeds to S405 after determining not to correct the input image data I.

Note that the representative value may be any value as long as it represents the characteristic amount F of the input image data I, and may be other than the average value, such as a median value, the maximum value, or the minimum value. Further, the representative value may be calculated from the characteristic amounts F of all the pixels in the input image data I, or may be calculated based only on the characteristic amounts F of part of the pixels in the input image data I, e.g., the pixels of the periphery of the hair region.

In S404, the correcting unit 204 performs a gloss adding correction on the input image data I. In the present embodiment, the correcting unit 204 adds a gloss with a shape suitable for the hair flow of the subject to the input image data I by obtaining a curve orthogonal to the hair flow based on the angle $\theta_{i,j}$ of hair flow and brightening up (and thus correcting) the pixel values of the pixels in a region which is along this curve and has a predetermined width therefrom.

Figure 8:
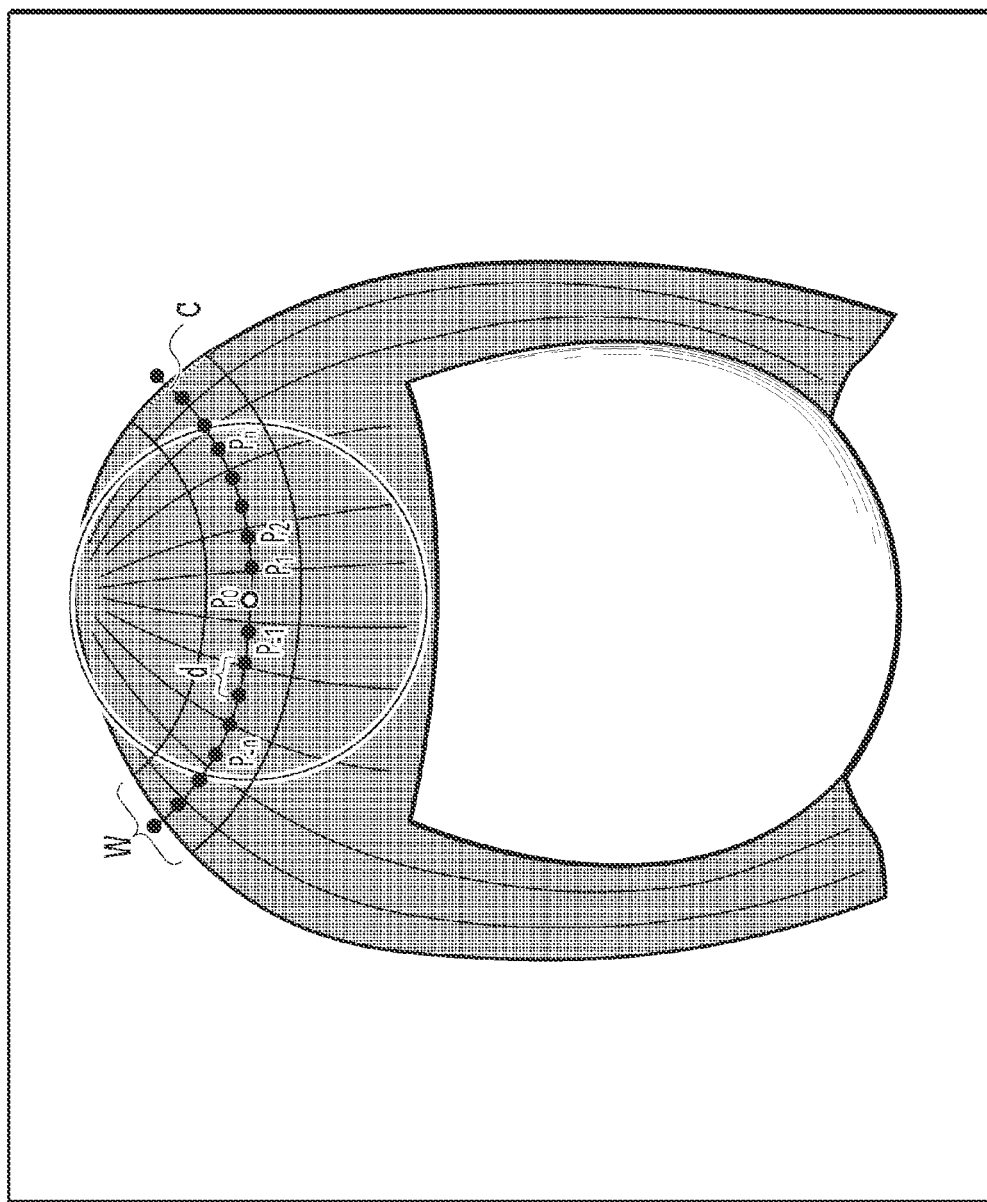
FIG. 8 is a diagram showing addition of a gloss.

First, the correcting unit 204 extracts, from the input image data I, pixels the characteristic amount F(i,j) of which equals or exceeds a threshold and sets the extracted pixels as a correction target region. Next, the correcting unit 204 obtains the center of the largest inscribed circle of the correction target region and sets the center as a reference point $P_0(i_0,j_0)$ for adding a gloss. Note that the reference point $P_0$ may be any other point as long as it is in the correction target region, such as the barycenter of the correction target region or any point to which a gloss is desirably added. FIG. 8 shows an example reference point $P_0$. In FIG. 8, the hatched portion is the correction target region.

Next, the correcting unit 204 obtains the coordinates of a point $P_1(i_1,j_1)$ and a point $P_{-1}(i_{-1},j_{-1})$ which are on a straight line of a slope $-1/\tan \theta_{i0,j0}$ passing through the reference point $P_0(i_0,j_0)$ and are away from the reference point $P_0(i_0,j_0)$ by a predetermined distance d. These points $P_1$ and $R_1$ are points that are offset from the reference point $P_0$ by d along a straight line perpendicular to the hair flow, i.e., a straight line of the slope $-1/\tan \theta_{i0,j0}$ passing through the reference point $P_0(i_0,j_0)$. Note that the smaller the distance d, the smoother the curve (polygonal line) formed by line segments connecting points P generated by the processing to be described below, thus, the smoother the shape of the gloss added. Note that the curve connecting the points P may be obtained as follows instead of connecting the points P with line segments. Specifically, a smoother curve connecting the points P may be obtained and used by using spline interpolation or the like. In this case, a curve shape according to the hair flow can be obtained by making the distance d small.

Next, for n=1, 2, 3, . . . , the correcting unit 204 sequentially obtains the coordinates of a point $P_{n+1}(i_{n+1},j_{n+1})$ satisfying the following formulae (9) to (11) until the point $P_{n+1}$ is located outside the correction target region.

$$(i_{n+1}-i_n)*\cos \theta_{in,jn}+(j_{n+1}-j_n)*\sin \theta_{in,jn}=0 \qquad (9)$$

$$-1 \leq \cos(\angle P_{n-1}P_nP_{n+1}) \leq 0 \qquad (10)$$

$$(i_{n+1}-i_n)^2+(j_{n+1}-j_n)^2=d^2 \qquad (11)$$

Formula (9) indicates that the point $P_{n+1}i(i_{n+1},j_{n+1})$ is on a straight line of a slope $-1/\tan \theta_{in,jn}$ passing through a point $P_n(i_n,j_n)$. Formula (10) indicates that $\angle P_{n-1}P_nP_{n+1}$ is not an acute angle. In other words, Formulae (9) and (10) together indicate that the point $P_{n+1}(i_{n+1},j_{n+1})$ is at a position which is on a straight line of the slope $-1/\tan \theta_{in,jn}$ passing through the point $P_n(i_n,j_n)$ and where $\angle P_{n-1}P_nP_{n+1}$ is not an acute angle. Formula (11) indicates that the distance from the point $P_n$ to the point $P_{n+1}$ is d.

Similarly, for n=-1, -2, -3, . . . , the correcting unit 204 sequentially obtains the coordinates of a point $P_{n-1}(i_{n-1},j_{n-1})$ satisfying the following formulae (12) to (14) until the point $P_{n-1}$ is located outside the correction target region.

$$(i_{n-1}-i_n)*\cos \theta_{in,jn}+(j_{n-1}-j_n)*\sin \theta_{in,jn}=0 \qquad (12)$$

$$-1 \leq \cos(\angle P_{n+1}P_nP_{n-1}) \leq 0 \qquad (13)$$

$$(i_{n-1}-i_n)^2+(j_{n-1}-j_n)^2=d^2 \qquad (14)$$

Lastly, the correcting unit 204 corrects the RGB values of pixels, out of the pixels in the correction target region, that are away from a curve C connecting the points Pn by not more than a predetermined distance w. The correcting unit 204 corrects the RGB values of each of those pixels by brightening up, i.e., increasing the luminance values of the pixels. Specifically, the correcting unit 204 multiplies each of the RGB values $I_R(i,j)$, $I_G(i,j)$, and $I_B(i,j)$ of the subject with a predetermined gain coefficient. Alternatively, the correcting unit 204 may add a predetermined bias value. While the gain coefficient or the bias value may be the same for all the RGB values representing respective color components as long as it increases the luminance values, the gain coefficient or the bias value may be different for each color component according to, for example, the coefficients for the color components in the above-described formula of conversion to the luminance value Y. Further, the gain coefficient or the bias value may be reduced according to the distance from the curve C so that the amount of correction may be smaller as the distance from the curve C increases.

Also, the correcting unit 204 may make a correction such that the pixels with larger characteristic amounts F(i,j) calculated in S503 may become brighter. In this case, a part with uniform hair flow is given a more emphasized gloss, and conversely, a part with relatively not uniform hair flow is given a modest gloss. Thus, a gloss can be added more suitably according to the state of hair flow of the subject.

In S405, the correcting unit 204 outputs image data according to the determination result in S403. Specifically, if it is determined in S403 to correct the input image data I, the correcting unit 204 sets the input image data corrected in S404 as output image data I'. If it is determined not to correct the input image data I, the correcting unit 204 sets the uncorrected input image data I as the output image data I'. The correcting unit 204 then outputs the output image data I' to a later-stage processor, thus ending the processing.

Figure 7E:
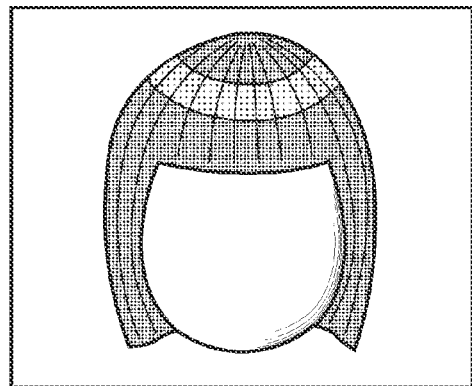
FIG. 7E is a diagram showing an example output image.
Figure 7F:
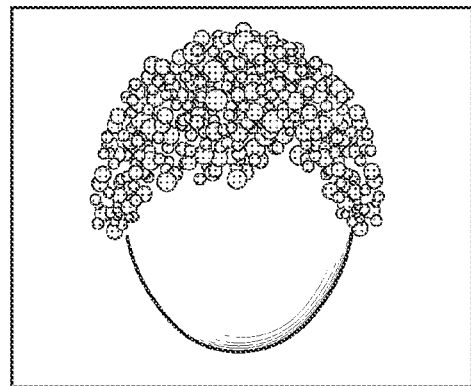
FIG. 7F is a diagram showing an example output image.

FIGS. 7E and 7F show example images outputted in cases where the images shown in FIGS. 7A and 7B are inputted, respectively. In a case where the image in FIG. 7A is inputted, it is deemed that the hair flow of the subject is uniform because the characteristic amount F equals or exceeds the predetermined threshold, and therefore it is determined that the input image is to be corrected. Thus, as in FIG. 7E, an output image with a gloss added thereto is outputted. By contrast, in a case where the image in FIG. 7B is inputted, it is deemed that the hair flow of the subject is not uniform because the characteristic amount F is below the predetermined threshold, and therefore it is determined that the input image is not to be corrected. Thus, as in FIG. 7F, the input image, i.e., an image with no gloss added thereto, is outputted as an output image.

The above-described processing control allows a gloss to be added suitably according to the state of the hair flow of a subject.

Although it is determined in S403 whether to correct the entire input image data I in the present embodiment, the determination on whether to correct the input image data I may be made for each particular region of the input image data I. For example, the following may be performed instead in a case where the input image data I contains more than one person as a subject. First, a publicly known region extraction technique is used to extract a hair region corresponding to each person. Then, a representative value of the characteristic amounts F is calculated for each hair region obtained, and it is determined whether to correct the hair region. Then, the correction in S404 is performed only on the pixels in the hair region(s) determined to be corrected. In this case, even in a case where an image contains a plurality of subjects with different states of hair flow, a gloss can be added suitably according to the hair flow of each of the subjects.

Alternatively, the correction determination may be made for each pixel. Specifically, in S403, the characteristic amount F(i,j) of each pixel is compared with a predetermined threshold, and if the characteristic amount F(i,j) equals or exceeds the threshold, it is deemed that the hair flow is uniform around the pixel. Then, it is determined to correct only the pixels for which it is deemed that the hair flow is uniform, and the luminance values of the pixel values of those pixels are corrected in S404. In this case, a gloss can be added suitably even in a case where, for example, a hair region corresponding to a single person partially has a different state of hair flow.

In the present embodiment, the characteristic amount F(i,j), which indicates the degree of alignment between the direction of hair flow at one pixel and the directions of hair flow at its neighboring pixels, is calculated for each pixel (S402), and the average value of the characteristic amounts F of all the pixels is calculated as a representative value (S403). However, the present disclosure is not limited to this, and the degree of alignment of hair flow in the entire image may be calculated as a characteristic amount F by making the filter size $N_a$ cover all the pixels in the input image data I in S402. In that case, the weighted average resultant vector calculated using Formulae (7) and (8) corresponds to the average value for all the pixels in the image, and therefore the length of this vector can be used as a representative value in S403.

Further, although the characteristic amount F(i,j) is calculated for each pixel in the present embodiment, the characteristic amount F(i,j) may be calculated for a set of pixels. In that case, the characteristic amount F(i,j) may be calculated as follows. A gradient direction vector is calculated based on the average value of the pixel values of the set of pixels, and a gradient steepness S and an angle θ are obtained for the set of pixels. Then, the characteristic amount F is calculated based on the gradient steepness S and the angle θ.

Although the characteristic amount F is calculated based on Formulae (6) to (8) in the present embodiment, a simpler characteristic amount may be used instead. For example, without the weighting by the gradient steepness S and the like, the length R of the average resultant vector of unit vectors with the double angle of the angle θ of each pixel within the filter may be simply used as the characteristic amount. Note that if the distribution of the angle θ (=1−R) is used as the characteristic amount, the input image data I may be corrected if the characteristic amount equals or falls below a predetermined threshold.

Further, although a gloss with a shape according to the angle of hair flow is added to the input image in S404 in the present embodiment, a gloss may be added using the technique of Patent Literature 1. Alternatively, a gloss may be added by additionally obtaining shape information on the surface of the subject and virtually calculating how light would be reflected if the subject were illuminated by a light source.

Embodiment 2

An image processing apparatus according to the present embodiment determines the three-dimensional flow direction of the hair of a subject, and based on this flow direction, calculates a component of light reflected by the subject among light made incident on the subject from the light source. According to the present embodiment, a gloss is added considering the hair flow of the subject, and thus a more natural gloss can be added to the hair of the subject.

The image processing apparatus according to the present embodiment can be implemented by a hardware configuration similar to that of Embodiment 1, and may have the hardware configuration shown in FIG. 1 or 2.

Figure 9:
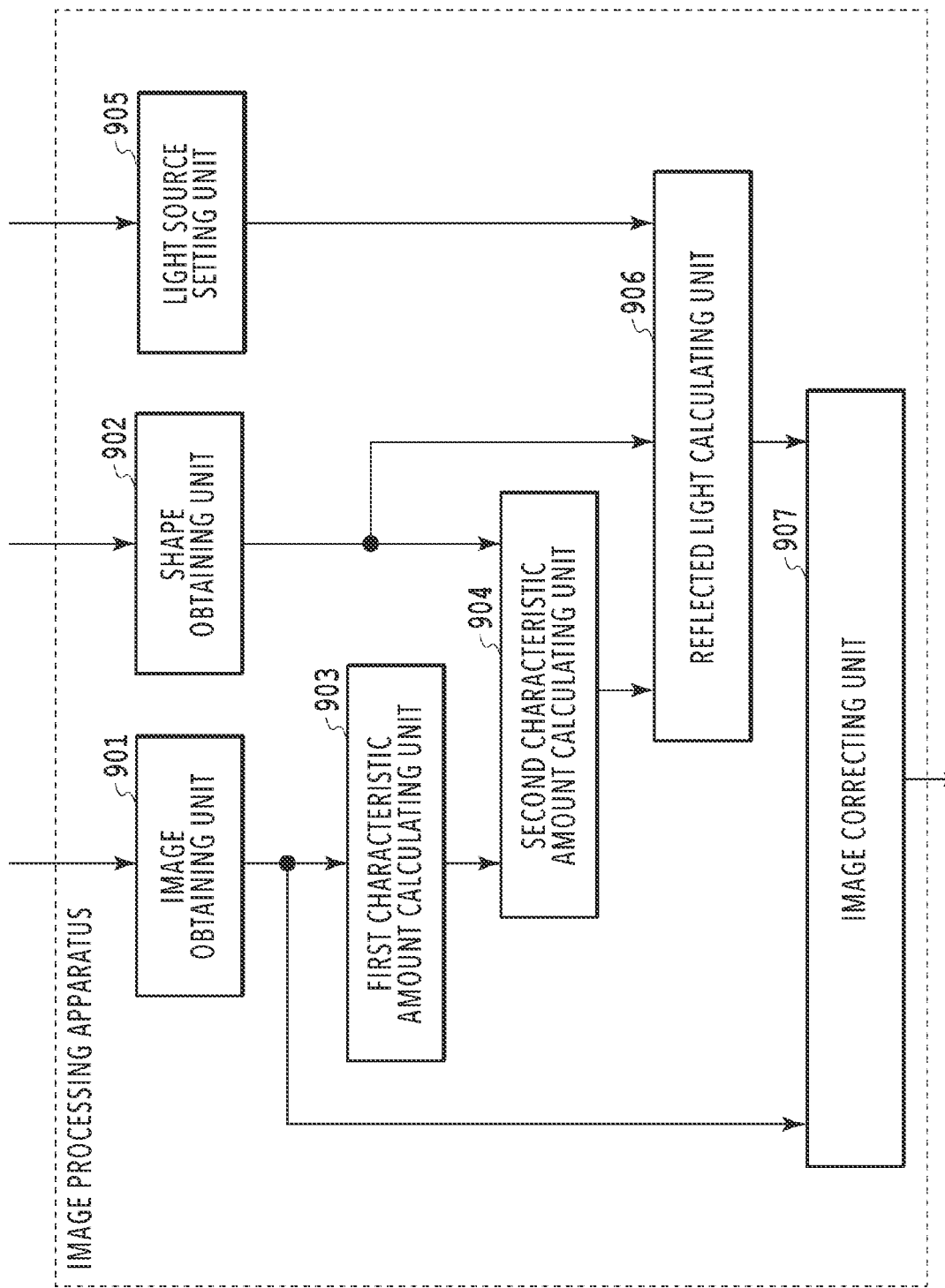
FIG. 9 is a diagram showing functional blocks of an image processing apparatus according to one embodiment.

FIG. 9 is a functional block diagram of the image processing apparatus of the present embodiment. An image obtaining unit 901 obtains image data on a subject. Hereinafter, image data on a subject is referred to as an input image. Meanwhile, a shape obtaining unit 902 obtains three-dimensional shape data on a subject. Referencing to the three-dimensional shape data on a subject allows the orientation of (or the direction normal to) the outer surface of the subject to be obtained for each pixel in the input image. For example, three-dimensional shape data on a subject may indicate the orientation of the surface of the subject at each position in the input image. The three-dimensional shape data is not limited to any particular kind, but in the following example, a normal map containing normal information is used as the three-dimensional shape data.

The image obtaining unit 901 and the shape obtaining unit 902 can obtain an input image and three-dimensional shape data, respectively, prestored in the PC/media 115, the storage unit 123, the external memory 127, or the like. The image obtaining unit 901 and the shape obtaining unit 902 may also obtain these pieces of data from the image capturing apparatus 125 connected to the storage unit 123 or the image processing apparatus. The image obtaining unit 901 sends the obtained input image to a first characteristic amount calculating unit 903 and an image correcting unit 907. The shape obtaining unit 902 sends the obtained three-dimensional shape data to a second characteristic amount calculating unit 904 and a reflected light calculating unit 906.

Figure 11A:
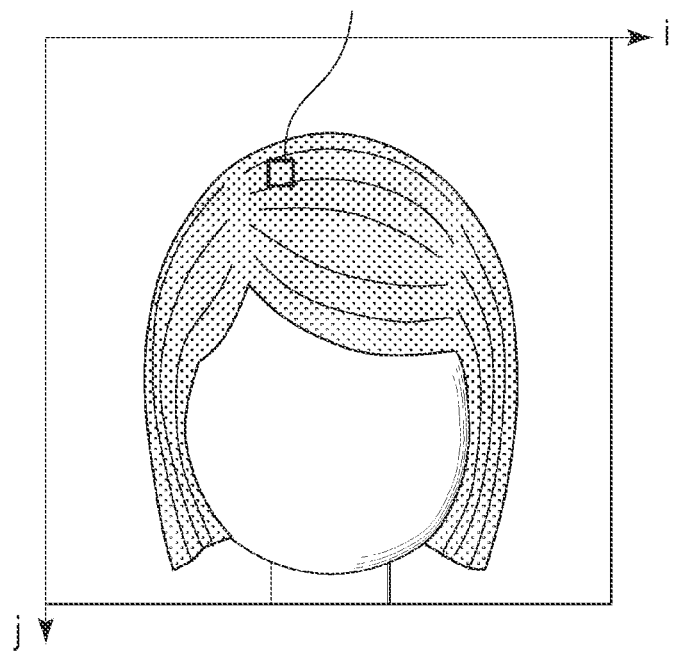
FIG. 11A is a diagram showing an example input image.
Figure 11B:
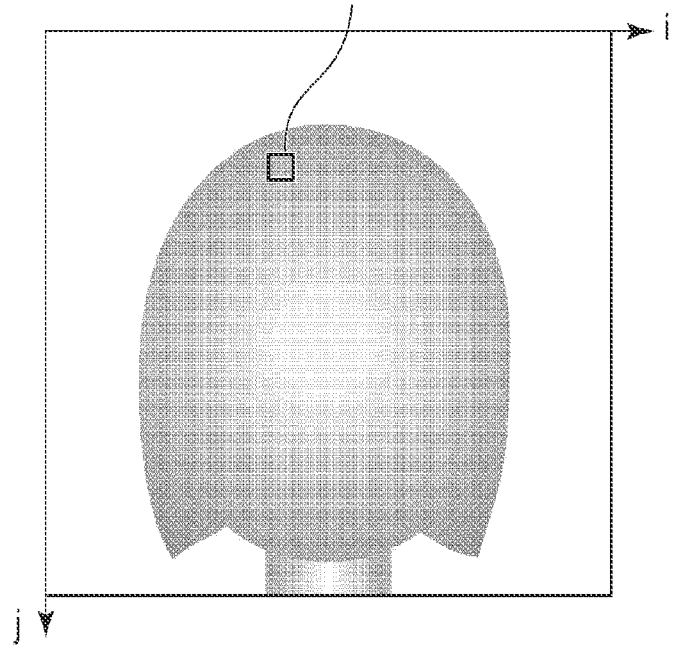
FIG. 11B is example normal information.
Figure 12:
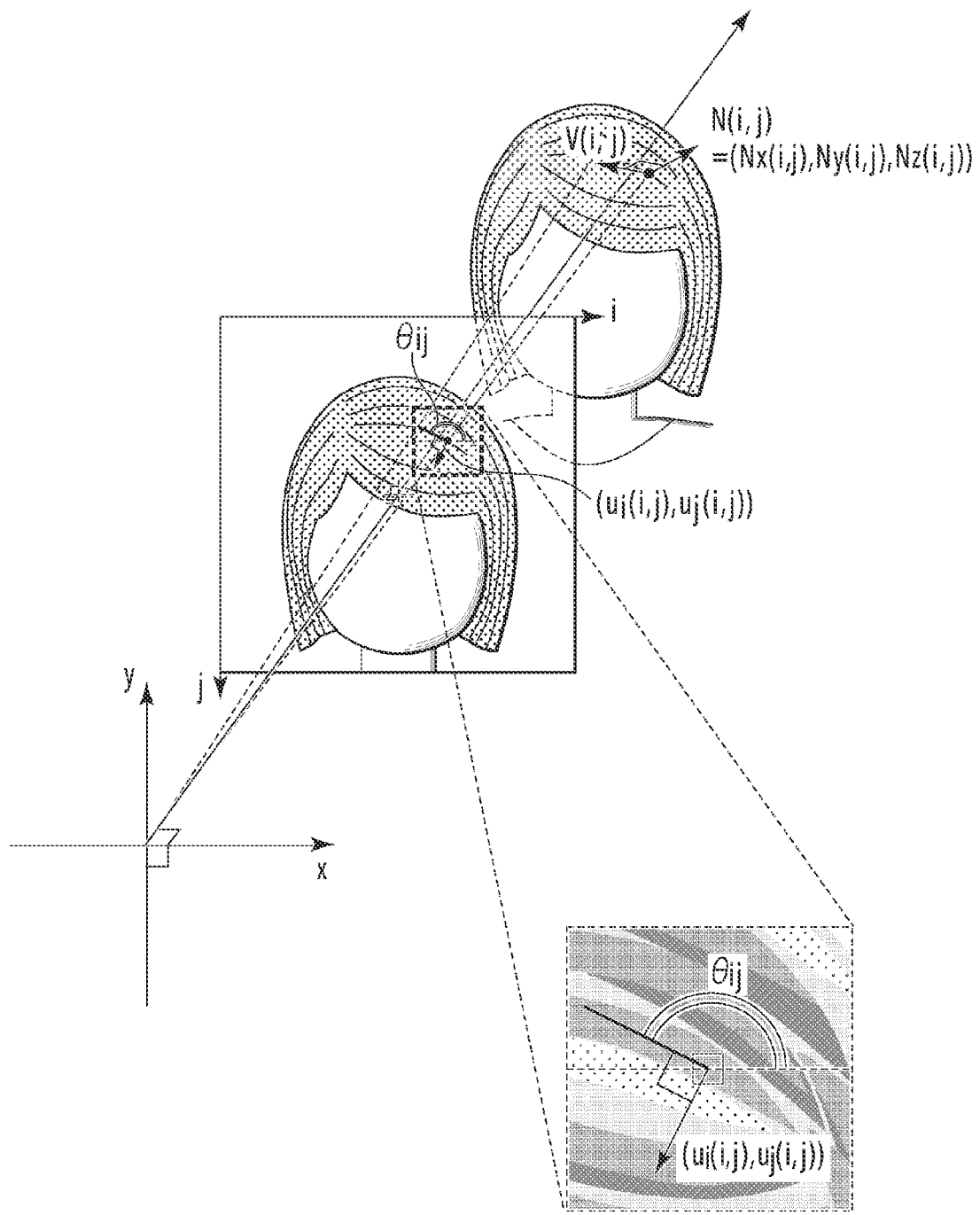
FIG. 12 is a diagram illustrating hair flow.

FIG. 11A shows an example input image, and FIG. 11B shows an example normal map. In the input image shown in FIG. 11A, the pixel value of the pixel (i,j) is the subject's RGB values Ig(i,j), Ig(i,j), and Ib(i,j) corresponding to the pixel (i,j). In other words, the pixel value I(i,j) in the input image=(Ig(i,j), Ig(i,j), Ib(i,j)). In the normal map shown in FIG. 11B, a unit normal vector indicating the shape of the subject is stored in the pixel (i,j). Specifically, the pixel value of the pixel (i,j) in the normal map is xyz component values Nx(i,j), Ny(i,j), Nz(i,j) of a unit normal vector of the surface of the subject corresponding to the pixel (i,j) in the input image. In other words, the pixel value N(i,j) in the normal map=(Nx(i,j), Ny(i,j), Nz(i,j)). Herein, the xyz coordinate system uses the coordinate system of the input image as the base. Specifically, as shown in FIG. 12, in the input image, the horizontal rightward direction is the x axis, the vertical upward direction is the y axis, and the depth direction (i.e., the direction of the optical axis of the image capturing apparatus) is the z axis.

In order for the normal map to express the surface shapes of the individual hairs in detail, the pixel size of the normal map needs to be smaller than the width of each hair. In other words, the normal map has to have a sufficiently high resolution. However, it is not easy to obtain a normal map with such a high resolution. In the present embodiment, the pixel size of the normal map (or the size of a region on a subject expressed by one pixel) is equivalent to or larger than the width of a single hair. Thus, in a hair region, the normal map does not express the shape of each hair, but expresses a rough shape of the head covered with hair.

The first characteristic amount calculating unit 903 and the second characteristic amount calculating unit 904 determine the three-dimensional flow direction of the hair of the subject based on the image of the subject and the three-dimensional shape data on the subject. The following describes specific example configurations of the first characteristic amount calculating unit 903 and the second characteristic amount calculating unit 904 in the present embodiment.

The first characteristic amount calculating unit 903 determines the characteristic amount of the hair of the subject on the image. In the present embodiment, the first characteristic amount calculating unit 903 determines the flow direction of the hair of the subject on the input image. More specifically, the first characteristic amount calculating unit 903 can calculate the angle of hair flow on the plane of the input image. In general, in a hair region, shadows are generated along the hair flow by overlapping hairs. Thus, in the present embodiment, the first characteristic amount calculating unit 903 obtains the gradient direction of brightness for each pixel using its pixel value in the input image, and estimates the angle of the hair flow based on this direction. In this way, the first characteristic amount calculating unit 903 can calculate the angle of hair flow, which is information indicating the flow direction of hair, for each pixel in the input image. Details of the processing will be given later. The first characteristic amount calculating unit 903 sends the information indicating the flow direction of hair on the input image to the second characteristic amount calculating unit 904.

The second characteristic amount calculating unit 904 determines the three-dimensional flow direction of the hair of the subject. To this end, the second characteristic amount calculating unit 904 can use the characteristic amount of the hair of the subject on the image, which is obtained from the first characteristic amount calculating unit 903. In the present embodiment, the second characteristic amount calculating unit 904 uses the information indicating the flow direction of the hair on the input image and the three-dimensional shape data on the subject obtained by the shape obtaining unit 902. For example, the second characteristic amount calculating unit 904 can convert the flow direction of hair on the input image at each pixel in the input image to a three-dimensional hair flow direction on the surface of the subject at the pixel, based on a direction normal to the surface of the subject at the pixel. In the present embodiment, the second characteristic amount calculating unit 904 estimates, for each pixel in the input image data, a three-dimensional slope representing the hair flow of the subject based on the normal map and the angle of hair flow on the input image. Details of the processing will be given later. The second characteristic amount calculating unit 904 sends the thus-calculated information on the three-dimensional hair flow directions to the reflected light calculating unit 906.

A light source setting unit 905 makes settings for the light source that illuminates the subject. For example, the light source setting unit 905 can set the direction in which light from the light source is incident on the subject. In the present embodiment, the light source setting unit 905 displays a UI for making settings for the light source on the display unit 114 or the display unit 128. The light source setting unit 905 then obtains a value instructed by a user on the UI. Details of this processing will be given later. The light source setting unit 905 sends the thus-set setting information on the light source to the reflected light calculating unit 906.

The reflected light calculating unit 906 and the image correcting unit 907 correct color information on the hair of the subject on the input image according to the three-dimensional flow direction of the hair of the subject. First, the reflected light calculating unit 906 calculates components of light reflected by the subject among light made incident on the subject from the light source, based on the three-dimensional flow direction of the hair of the subject. Here, the reflected light calculating unit 906 can calculate reflected light components for the subject in the input image in accordance with the settings information on the light source as well. In this event, the reflected light calculating unit 906 can also reference to the three-dimensional shape data on the subject. The reflected light calculating unit 906 can calculate the quantity of reflected light components considering the anisotropy which is based on the slopes of the hair in the three-dimensional space. Details of the processing will be given later. The reflected light calculating unit 906 sends the thus-calculated reflected light components to the image correcting unit 907.

The image correcting unit 907 generates a corrected image by correcting a gloss on the subject in the input image based on the reflected light components obtained from the reflected light calculating unit 906. The image correcting unit 907 can generate corrected image data by adding a gloss to the subject in the input image based on the reflected light components. In the present embodiment, the image correcting unit 907 adds a gloss with a shape according to the hair flow of the subject to the input image by using the reflected light components which are based on the slopes of the hair in the three-dimensional space. Details of the processing will be given later. The image correcting unit 907 can send the thus-generated corrected image data to the display unit 114 or the display unit 128 to display the corrected image data. The image correcting unit 907 can also send the thus-generated corrected image data to the PC/media 115, the storage unit 123, the external memory 127, or the like to store the corrected image data.

Figure 10:
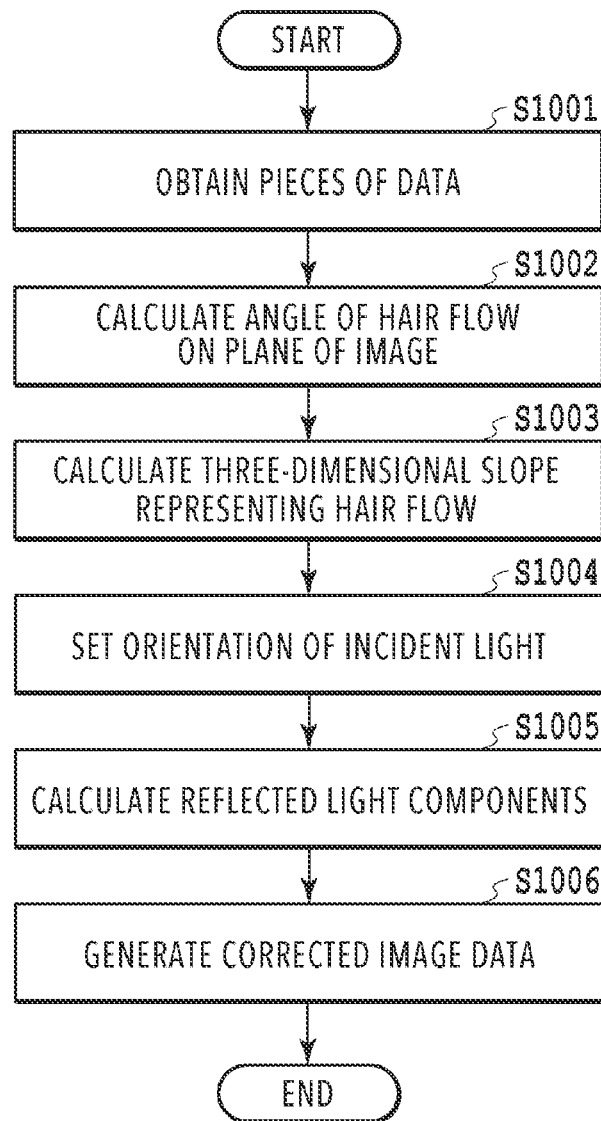
FIG. 10 is a flowchart of an image processing method according to one embodiment.

FIG. 10 is a flowchart showing a processing procedure performed by the image processing apparatus. Details of each processing step are described below. In S1001, the image obtaining unit 901 obtains input image data as described earlier, and the shape obtaining unit 902 obtains a normal map as described earlier.

In S1002, for each pixel in the input image obtained in S1001, the first characteristic amount calculating unit 903 calculates the angle of hair flow on the plane of the image. As described earlier, shadows are generated in a hair region along the hair flow by overlapping hairs. In the present embodiment, the first characteristic amount calculating unit 903 calculates a direction perpendicular to the direction of the gradient of brightness of the shadows as the direction of hair flow on the image. Here, at the pixel (i,j) of the input image, an angle formed between the direction of hair flow and the lateral direction of the image is expressed as an angle $\theta_{i,j}$ of hair flow.

The first characteristic amount calculating unit 903 can estimate the angle $\theta_{i,j}$ of hair flow of each pixel (i,j) in the input image in accordance with, for example, Formulae (1), (2), and (5).

In S1003, using the normal map obtained in S1001 and the angle of hair flow calculated in S1002, the second characteristic amount calculating unit 904 estimates a three-dimensional slope representing the hair flow of the subject for each of the pixels in the input image obtained in S1001. In the present embodiment, it is assumed that the hair flow captured in the input image is on and along the surface of the subject expressed by the normal map. Then, the slope of hair flow in the three-dimensional space (the xyz coordinate space) is orthogonal to the direction normal to the surface of the subject. Based on these conditions, the second characteristic amount calculating unit 904 can calculate the three-dimensional slope of hair flow of the subject for each pixel in the input image.

For example, the second characteristic amount calculating unit 904 can calculate a three-dimensional vector V(i,j) representing the hair flow in the three-dimensional space and use the slope of this three-dimensional vector V(i,j) as a three-dimensional slope of the hair flow. Here, the three-dimensional vector V(i,j) satisfies the following formulae (15) and (16). Formula (15) expresses that, as shown in FIG. 12, the angle formed between the lateral direction of the image and a vector obtained by projection of the three-dimensional vector V(i,j) onto the plane of the input image coincides with the angle $\theta_{i,j}$ of hair flow on the input image (i.e., the angle formed between the lateral direction of the image and the hair flow on the input image). Formula (16) expresses that the vector V(i,j) and the unit normal vector N(i,j) at the pixel (i,j) in the normal map are orthogonal to each other. Rearranging Formulae (15) and (16) shows that the vector V(i,j) can be expressed by Formula (17).

$$V(i,j)=(\cos\theta_{i,j}, \sin\theta_{i,j}, V_z(i,j)) \quad (15)$$

$$N(i,j)\cdot V(i,j)=0 \quad (16)$$

$$V(i,j) = \left(\cos\theta_{i,j}, \sin\theta_{i,j}, -\frac{\cos\theta_{i,j}N_x(i,j) + \sin\theta_{i,j}N_y(i,j)}{N_z(i,j)}\right) \quad (17)$$

Using Formula (17), the second characteristic amount calculating unit 904 can calculate the vector V(i,j) for each pixel (i,j) in the input image.

In S1004, the light source setting unit 905 displays a UI on the display unit 114 or the display unit 128 to allow light source settings to be made. Then, based on the setting value obtained through the UI, the light source setting unit 905 sets the orientation of incident light from the light source to the subject. FIGS. 13A to 13F each show an example UI. An image display region 1301 is where an input image or a corrected image generated by the processing to be described later is displayed. A light source icon 1302 is an object indicating the position of a light source. The light source icon 1302 is a disc-shaped object, and arrows are also shown near the light source icon 1302 to indicate that this object can be moved. The point of intersection of guide curves 1303 called vertex guide curves represents the vertex. Further, guide curves 1304 called motion guide curves represent the leftward and rightward directions and the upward and downward directions based on the currently-set position of the light source.

Figure 14:
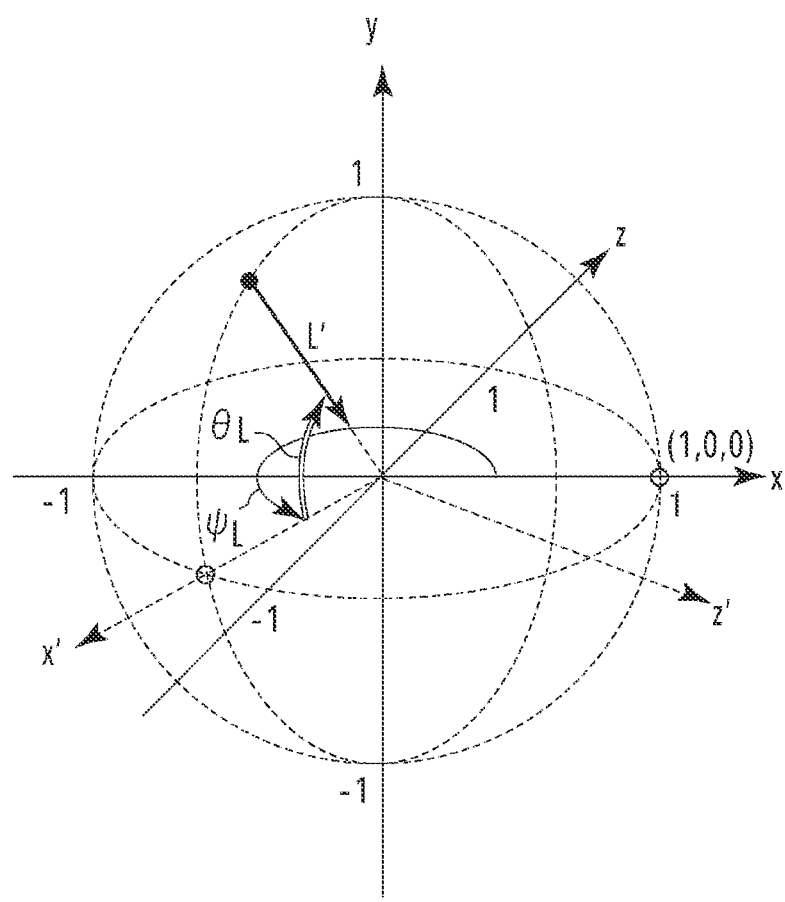
FIG. 14 is a diagram illustrating a rotational angle of a light source and the orientation of incident light.

A user can set the orientation of incident light by manipulating sliders 1305, 1306 associated with the rotation angles $\theta_L$, $\psi_L$, respectively, of the light source, while referencing to the image, the icon, and the guide lines displayed on the UI. FIG. 14 shows an example of the correspondences between the rotation angles $\theta_L$, $\psi_L$ and the orientation of incident light. In FIG. 14, $\psi_L$ denotes the rotation angle about the y axis, and $\theta_L$ is an angle formed with respect to an x' axis which is the x axis rotated about the y axis by $\psi_L$. In other words, $\psi_L$ can indicate an azimuthal angle on the xz plane, and $\theta_L$ can indicate an elevation angle with respect to the xz plane. In the present embodiment, a unit vector from a point obtained by rotating and moving a point (1,0,0) by $\psi_L$ and $\theta_L$, toward the point of origin (0,0,0) is set as the orientation of incident light L'. Specifically, in response to the user manipulating the slider 1305, a value corresponding to the position of the slider 1305 is set as $\theta_L$. In addition, in response to manipulation of the slider 1306, a value corresponding to the position of the slider 1306 is set as $\psi_L$. Then, based on these angles, the orientation of incident light L' is calculated in accordance with the following formula.

$$L'=-(\cos\theta_L \cos\psi_L, \sin\theta_L, \cos\theta_L \sin\psi_L) \quad (18)$$

In the examples in FIGS. 13A to 13F, for the slider 1305, the far-left position is associated with $\theta_L=0$, and the far-right position is associated with $\theta_L=\pi$, and for the slider 1306, the far-left position is associated with $\psi_L=\pi$, and the far-right position is associated with $\psi_L=2\pi$. Here, with the value of $\psi_L$ being fixed, moving the slider 1305 to the left makes the subject illuminated from the nearer side (FIG. 13B) and moving the slider 1305 to the right makes the subject illuminated from the farther side (FIG. 13C). Meanwhile, with $\theta_L$ being fixed at a value satisfying $0\leq\theta_L<\pi/2$, moving the slider 1306 to the left makes the subject illuminated from the more leftward side (−x direction), and moving the slider 1306 to the right makes the subject illuminated from the more rightward direction (+x direction) (FIGS. 13D, 13E). Further, with $\theta_L$ being fixed at a value satisfying $\pi/2<\theta_L\leq\pi$, moving the slider 1306 to the left makes the subject illuminated from the more rightward side (+x direction) (FIG. 13F), and moving the slider 1306 to the right makes the subject illuminated from the more leftward direction (−x direction). Nevertheless, use of the UI is not essential. The light source setting unit 905 may obtain predefined light source settings, and may set, for example, a predefined direction of the light source. Further, the light source setting unit 905 may set other types of information on the light source, such as the intensity of the light source.

In S1005, the reflected light calculating unit 906 calculates reflected light components. Herein, the reflected light calculating unit 906 can take into account the difference in the amount of reflected light depending on the hair flow (i.e., anisotropic reflection). In the present embodiment, the reflected light calculating unit 906 calculates a reflected light component such that the spread of reflected light in the three-dimensional flow direction of the hair is different from the spread of reflected light in a direction perpendicular to the three-dimensional flow direction of the hair. For example, the reflected light calculating unit 906 can calculate a reflected light component such that the spread of a distribution of the amount of reflected light along the direction of the hair flow is different from the spread of a distribution of the amount of reflected light along the direction perpendicular to the hair flow. In the present embodiment, the reflected light calculating unit 906 calculates a reflected light component using the normal map obtained in S1001, the three-dimensional slope of the hair flow calculated in S1003, and the orientation of incident light set in S1004. The reflected light calculating unit 906 can calculate a reflected light component for each position on the input image. For example, the reflected light calculating unit 906 can calculate, for each pixel in the input image, a reflected light component from a corresponding position on the subject to the viewpoint from which the input image was captured.

An anisotropic reflection model is usable for the calculation of such a reflected light component. The present embodiment uses the following formula, which is a formula for calculating a specular reflection component $\rho_S$ in the Ashikhmin model.

$$\rho_s = C_A \frac{(N \cdot H)^{C_{exp}}}{(H \cdot L)\max(N \cdot L, N \cdot E)} \tag{19}$$

$$H = \frac{L+E}{|L+E|} \tag{20}$$

$$C_{exp} = \frac{n_u(H \cdot U)^2 + n_v(H \cdot V)^2}{1 - (H \cdot N)^2} \tag{21}$$

$$C_A = \frac{\sqrt{(n_u+1)(n_v+1)}}{8\pi} \tag{22}$$

In Formulae (19) and (20), L denotes a light source vector from the position of the subject to the position of the light source, E denotes a viewpoint vector from the position of the subject to the position of the viewpoint, and F denotes a Fresnel reflection coefficient. Further, in Formulae (19) and (21), N denotes a unit normal vector, U denotes a tangent vector indicating the tangential direction, and V denotes a binormal vector indicating the binormal direction, all of them being unit vectors orthogonal to one another. Then, in Formulae (21) and (22), $n_u$ is a coefficient for controlling the reflection characteristics in the tangential direction. The smaller the coefficient $n_u$, the gentler the change in the intensity of the reflected light in the tangential direction, and the more the distribution of the reflected light spreads in the tangential direction. Further, $n_v$ is a coefficient for controlling the reflection characteristics in the binormal direction. The larger the coefficient $n_v$, the steeper the change in the intensity of the reflected light in the binormal direction, and the narrower the distribution of the reflected light in the binormal direction.

In the present embodiment, for the pixel (i,j) in the input image, N=N(i,j), L=−L', E=(0,0,−1), U=(V(i,j)/|V(i,j)|)×N (i,j), and V=V(i,j)/|V(i,j)| are used. By thus computing $\rho_S$ obtained in accordance with Formulae (19) to (22), the reflected light calculating unit 906 can calculate the reflected light component $\rho_S(i,j)$ for each pixel (i,j) in the input image. As the binormal vector V, this example uses a vector obtained by normalizing the vector V(i,j) calculated in S1003, and thus, the direction of the slope of the hair flow is the binormal direction. Hence, determining the coefficients $n_u$ and $n_v$ so that they satisfy $n_u < n_v$ allows the distribution of the reflected light to spread in the direction perpendicular to the hair flow, and a gloss on the hair can be expressed by using such a distribution of the reflected light. Note that the coefficients $n_u$ and $n_v$ may be predefined, or designated by a user on the UI.

In S1006, the image correcting unit 907 generates corrected image data by adding a gloss to the subject in the input image obtained in S1001 based on the reflected light components calculated in S1005. The image correcting unit 907 can add the reflected light components from the subject to the viewpoint from which the image was captured to the respective pixels in the input image, the reflected light components having been calculated for the respective pixels in S1005. For example, in accordance with Formulae (23) to (25), the image correcting unit 907 can calculate the pixel values (I'r(i,j), I'g(i,j), I'b(i,j)) of the pixels in the corrected image corresponding to the pixels (i,j) in the input image.

$$I'_r = I_r(i,j) + \alpha_r \rho_S(i,j) \tag{23}$$

$$I'_g(i,j) = I_g(i,j) + \alpha_g \rho_S(i,j) \tag{24}$$

$$I'_b(i,j) = I_b(i,j) + \alpha_b \rho_S(i,j) \tag{25}$$

In the above formulae, $\alpha_r$, $\alpha_g$, and $\alpha_b$ are coefficients indicating the intensities of the R, G, and B components of the light source, respectively. These values may be predefined, or designated by a user on the UI.

Figure 15:
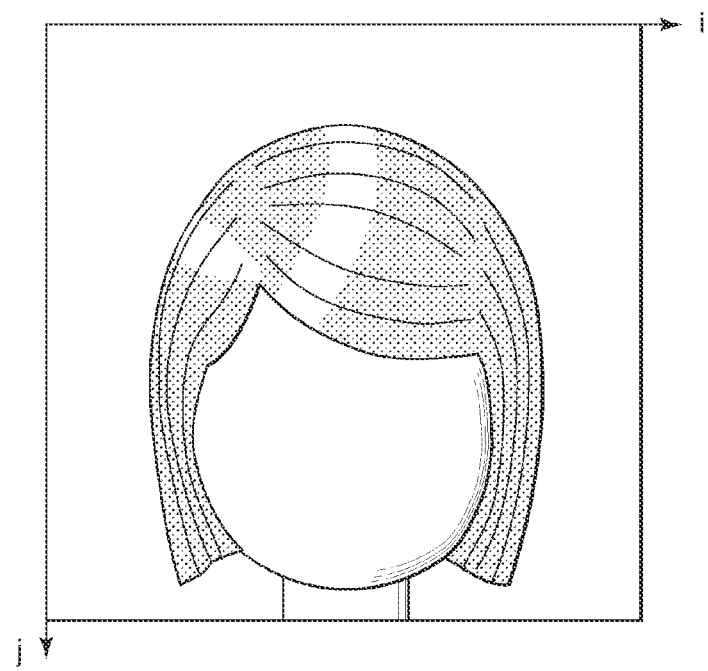
FIG. 15 is a diagram showing an example corrected image.

The image correcting unit 907 can further display the thus-generated corrected image data on the image display region 1301 on the UI shown in FIGS. 13A to 13F, and also, can output the corrected image data to the PC/media 115, the storage unit 123, the external memory 127, or the like for storage. FIG. 15 shows an example corrected image corresponding to the light source position shown in FIG. 13B.

According to the processing of the present embodiment described above, a gloss with a shape according to the hair flow of the subject can be added to an input image. In S1005 described above, a constant viewpoint vector (0,0,−1) (i.e., the opposite direction from the image capturing optical axis) is used regardless of the position of a pixel in the input image. However, in another embodiment, a viewpoint vector may be set for each pixel by taking into account the positional relation between the optical center of the image capturing apparatus and a part of the subject corresponding to the pixel. For example, for each pixel, three-dimensional coordinates of the part corresponding the pixel of the subject may be obtained with respect to the optical center of the image capturing apparatus based on the distance from the image capturing plane to the subject along the image capturing optical axis and the angle of view of the image capturing apparatus, and the viewpoint vector may be set based on the three-dimensional coordinates. Using such viewpoint vectors for the respective pixels enables addition of a more realistic gloss.

Although the above example applies the correction processing to the entire input image, the correction processing may be performed only on a hair region. For example, the above-described gloss adding processing may be performed on a hair region which has been extracted from the input image data as preprocessing.

The following describes modifications of Embodiment 2. Any one or more of the following modifications may be used in combination.

Modification 1 of Embodiment 2

In Modification 1, the first characteristic amount calculating unit 903 generates, from input image data, a shadow map that indicates a shadow on the subject at each position in the input image, and based on the shadow map, calculates an angle of hair flow on the plane of the input image. The shadow map can express fine shadows along the hair flow.

In this modification, it is assumed that a minute region on the input image and regions near the minute region contain the subject with similar reflection characteristics under almost the same illumination conditions. Under this assumption, by expressing the brightness of each pixel with a value relative to the brightness of its neighboring pixels, shadows along the hair flow can be extracted after removal of general differences in brightness due to the colors of the subject itself and the light distribution of the lighting. By thus removing the general differences in brightness, it is expected that the first characteristic amount calculating unit 903 can calculate a more reliable angle of hair flow on the plane of the input image.

For example, in S1002, the first characteristic amount calculating unit 903 can first calculate, for each pixel in the input image, a brightness Y'(i,j) relative to its neighbors in accordance with Formula (26). The first characteristic amount calculating unit 903 stores the calculated values as pixel values in the shadow map.

$$Y'(i, j) = \frac{\frac{1}{b^2}\sum_{i',j' \in B} Y(i+i', j+j')}{\frac{1}{b^2(N_B^2-1)}\left(\sum_{i',j' \in B'} Y(i+i', j+j') - \sum_{i',j' \in B} Y(i+i', j+j')\right)} \quad (26)$$

In Formula (26), B denotes a minute block region with a size of b×b centered at the pixel (i,j), and B' is a block region with a size of $bN_B \times bN_B$ centered at the pixel (i,j), or in other words, a neighboring region of the block region B. The brighter the minute region centered at the pixel (i,j) in the input image is than the neighboring region, the larger the pixel value Y'(i,j) in the shadow map obtained in accordance with Formula (26).

Thereafter, the first characteristic amount calculating unit 903 calculates the angle of hair flow on the plane of the input image using the shadow map instead of the input image data. The first characteristic amount calculating unit 903 can estimate that a direction perpendicular to the direction of the gradient of a pixel value in the shadow map is the direction of hair flow. Specifically, the first characteristic amount calculating unit 903 can calculate the angles $\theta_{i,j}$ in accordance with Formulae (15) to (19) using the pixel value Y'(i,j) in the shadow map, instead of the luminance value Y(i,j) which is based on the input image.

Modification 2 of Embodiment 2

In Modification 2, the first characteristic amount calculating unit 903 corrects the angle of hair flow on the input image. For example, the first characteristic amount calculating unit 903 can additionally perform smoothing processing on information indicating the flow direction of hair on the image at each position in the input image. In this modification, the angle of hair flow on the input image is corrected using a gradient steepness. For example, a higher reliability is given to a pixel with a larger gradient steepness and to an angle of hair flow calculated for this pixel. Then, the first characteristic amount calculating unit 903 smooths the angles of hair flow while giving a larger weight to a more reliable pixel. In this way, the first characteristic amount calculating unit 903 can correct the angle of hair flow in a pixel which shows a small change in brightness and therefore is hard to judge the orientation of the hair flow. It is expected that with such a correction the first characteristic amount calculating unit 903 can calculate more reliable angles of hair flow on the plane of the input image.

For example, in S1002, the first characteristic amount calculating unit 903 can correct the angle $\theta_{i,j}$ obtained in accordance with Formulae (1) to (5). In this correction, the gradient steepness calculated in accordance with Formula (1) can be used for the weight assignment. Specifically, first, the first characteristic amount calculating unit 903 can calculate a weighted average resultant vector $v_\theta(i,j)$ for each pixel (i,j) in the input image in accordance with Formulae (27) to (29). In Formulae (28) and (29), a Gaussian distribution G and the gradient steepness S obtained by Formula (1) are used as weights. The vector $v_\theta(i,j)$ obtained here is a weighted average resultant vector of vectors (cos $2\theta_{i,j}$,sin $2\theta_{i,j}$) defined based on the angle $\theta_{i,j}$. Then, based on the average resultant vector $v_\theta(i,j)$, the first characteristic amount calculating unit 903 can calculate the angle $\theta'_{i,j}$ defined by Formula (30), as the corrected angle of hair flow at the pixel (i,j). Note that the pixel (i', j') denotes a pixel around the pixel (i,j), and can be defined similarly to Modification 1.

$$v_\theta(i,j) = (v_{\theta'i}(i,j), v_{\theta'j}(i,j)) \quad (27)$$

$$v_{\theta'i}(i,j) = \frac{\sum_{i',j'} (G(i',j',\sigma)S(i+i',j+j')\cos 2\theta_{i+i',j+j'})}{\sum_{i',j'} (G(i',j',\sigma)S(i+i',j+j'))} \quad (28)$$

$$v_{\theta'j}(i,j) = \frac{\sum_{i',j'} (G(i',j',\sigma)S(i+i',j+j')\sin 2\theta_{i+i',j+j'})}{\sum_{i',j'} (G(i',j',\sigma)S(i+i',j+j'))} \quad (29)$$

$$\theta'_{i,j} = \frac{1}{2}\tan^{-1}\left(\frac{v_{\theta'j}(i,j)}{v_{\theta'i}(i,j)}\right) \quad (30)$$

The second characteristic amount calculating unit 904 can calculate the slope of the hair flow of the subject in the three-dimensional space using the angle $\theta'_{i,j}$ instead of the angle $\theta_{i,j}$.

Modification 3 of Embodiment 2

In Modification 3, the reflected light calculating unit 906 corrects the intensity of a gloss to add according to the state of the hair flow of the subject or to the hair texture of the user's preference. For example, in a case where the hair flow is unruly or it is hard to judge the hair flow, the reflected light calculating unit 906 can correct reflected light components to lower the gloss. Further, the reflected light calculating unit 906 can correct reflected light components taking shadows of the hair flow into account. Furthermore, the reflected light calculating unit 906 can correct reflected light components according to a hair texture parameter designated by the user.

First, a description is given of a method for correcting reflected light components to lower the gloss in a case where the hair flow of the subject is unruly or it is hard to judge the hair flow. The first characteristic amount calculating unit 903 can correct a reflected light component corresponding to each position on the input image, according to the degree of coincidence in the direction of the hair flow of the subject on the input image or in the three-dimensional space in an area around the each position. Such a configuration enables reflected light components to be corrected to lower the gloss in a case where there is a small degree of coincidence in the direction of the hair flow because the hair flow is unruly. Further, the first characteristic amount calculating unit 903 can correct a reflected light component corresponding to each position on the input image according to the gradient steepness of brightness at the each position. Such a configuration enables reflected light components to be corrected to lower the gloss in a case where it is hard to judge the hair flow because of a low gradient steepness.

In this modification, the first characteristic amount calculating unit 903 can calculate the reliability of an angle of hair flow on the input image. The reliability of an angle of hair flow at the pixel (i,j) can be set such that the more similar the angles $\theta_{i,j}$ in neighbors of the pixel (i,j) are, the higher the reliability. In this way, the reliability can be set to be small in a case where the hair flow is unruly. Also, the reliability of an angle of hair flow at the pixel (i,j) can be set such that the higher the gradient steepness S at the pixel (i,j), the higher the reliability. In this way, the reliability can be set to be small in a case where it is hard to judge the hair flow.

As a specific example, in S1002, the first characteristic amount calculating unit 903 can obtain the length of the average resultant vector $v_{\theta'}(i,j)$ calculated in accordance with Modification 2, as the reliability of each pixel in the input image. For example, the first characteristic amount calculating unit 903 can calculate a reliability $F_R(i,j)$ of the angle of hair flow at the pixel (i,j) in accordance with Formula (31).

$$F_R(i,j) = \sqrt{v_{\theta'i}(i,j)^2 + v_{\theta'j}(i,j)^2} \quad (31)$$

Here, the reliability $F_R(i,j)$ indicates how much a distribution of the pre-correction angles $\theta_{i,j}$ of hair flow concentrates around the post-correction angle $\theta'_{i,j}$ of hair flow (i.e., a degree of coincidence). The more similar the pre-correction angles $\theta_{i,j}$ at neighbors of the pixel (i,j) are to each other, the larger the value of the reliability $F_R(i,j)$, and the reliability $F_R(i,j)$ reaches the maximum value, 1, if the angles at neighbors of the pixel (i,j) are equal to each other. Meanwhile, in a case where the hair flow is unclear at and around the pixel (i,j), the gradient steepness S is small. Thus, the reliability $F_R$ is a small value in such a case as well.

Then, the reflected light calculating unit 906 can correct the reflected light components calculated as above, using the reliabilities of the angles of hair flow. For example, for each pixel (i,j) in the input image, the reflected light calculating unit 906 can multiply the reflected light component $P_S(i,j)$ with the reliability $F_R(i,j)$. Such a configuration allows reflected light components to be corrected to lower the gloss in a case where the hair flow of the subject is unruly or in a case where it is hard to judge the hair flow.

Next, a description is given of a method for correcting the intensity of a gloss to add according to the hair texture of the user's preference. First, the light source setting unit 905 can obtain the settings for the degree of changing hair texture. For example, in S1004, the light source setting unit 905 can display a UI on the display unit 114 or the display unit 128 for making settings for the orientation of incident light and for the degree of changing hair texture. The light source setting unit 905 can obtain values designated by the user on the UI and set the orientation of incident light and the degree of changing hair texture according to these values.

Figure 16:
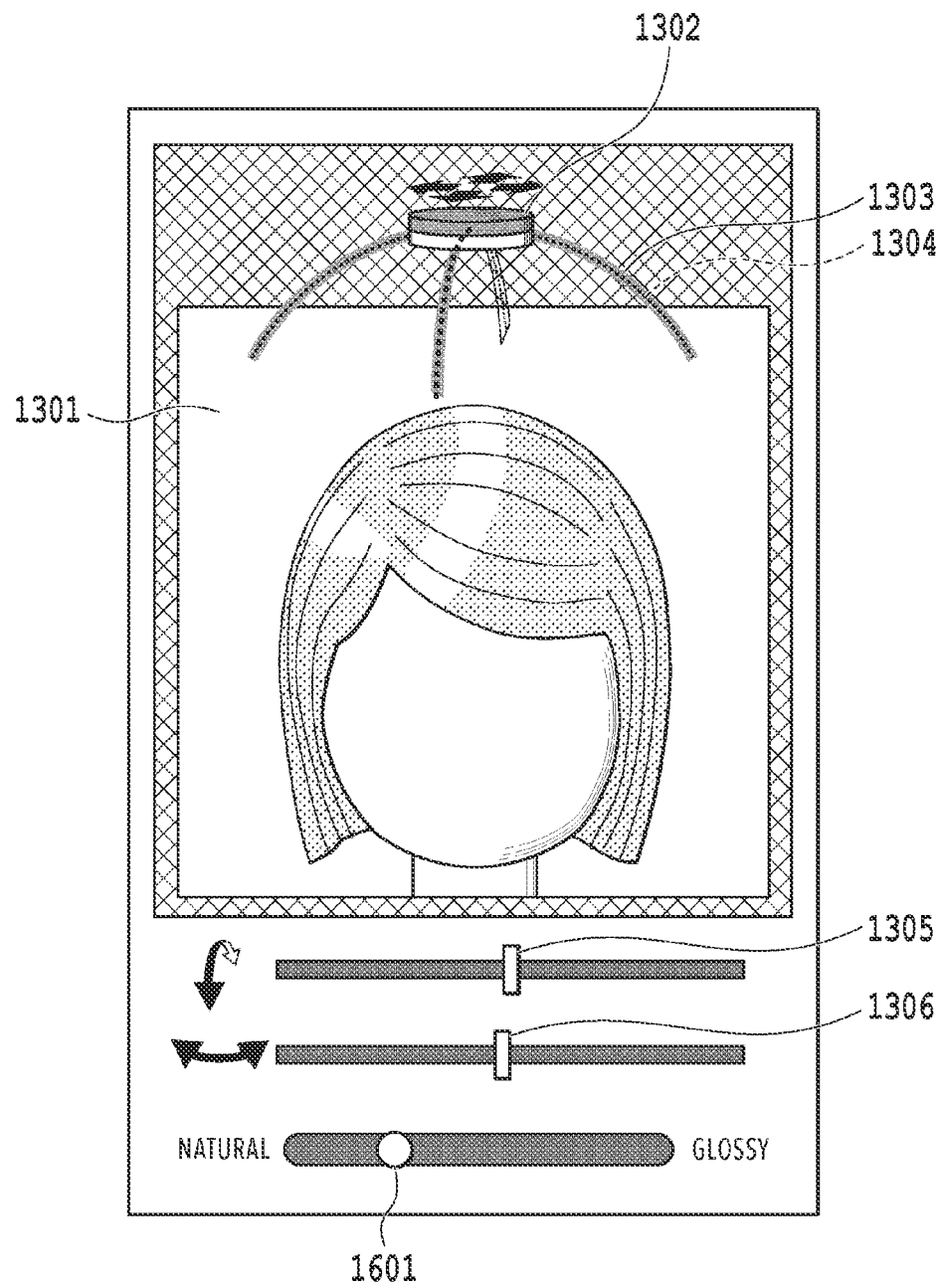
FIG. 16 is a diagram showing an example UI.

FIG. 16 shows an example UI. As described above, the user can set the orientation of the incident light L' by manipulating the sliders 1305, 1306 while referencing to the image displayed in the image display region 1301, the light source icon 1302, and the guide curves 1303, 1304. Further, in response to the user manipulating a slider 1601, a value corresponding to the position of the slider 1601 is set as a hair texture change degree $\alpha_Q$. In the example in FIG. 16, the far-left position of the slider 1601 is associated with $\alpha_Q=0$ (minimum), and the far-right position of the slider 1601 is associated with $\alpha_Q=100$ (maximum). As the user moves the slider 1601 to the right, the hair texture change degree $\alpha_Q$ increases. Here, increasing hair texture change degree $\alpha_Q$ intensifies the gloss to be added to the hair of the subject.

The following describes an example method for correcting the intensity of the gloss according to the hair texture change degree thus set. In the following example, reflected light components are corrected according to the shadows in the hair flow. The shadow map described in Modification 1 can be used as information indicating the shadows in the hair flow. Here, in order to correct the intensity of a gloss according to the hair texture change degree, the reflected light calculating unit 906 can adjust the shadow map according to the hair texture change degree. In this example, the reflected light calculating unit 906 smooths out the fine shadows along the hair flow expressed by the shadow map, by performing smoothing on the shadow map considering the angles of the hair flow. For example, according to the hair texture change degree designated, the reflected light calculating unit 906 can smooth the shadow map indicating a shadow on the subject at each position in the input image, along the flow direction of the hair of the subject on the input image.

Specifically, in S1005, the reflected light calculating unit 906 can calculate adjusted pixel values $Y_S(i,j)$ in the shadow map in accordance with Formulae (32) and (33). Here, $Y_S(i,j)$ is the average value of pixel values $Y'(i,j)$ in the shadow map where slopes passing through their pixels (i,j) are along the straight line of $\theta'_{i,j}$. Nevertheless, $\theta_{i,j}$ may be used instead of $\theta'_{i,j}$ obtained in Modification 2.

$$Y_S(i,j) = \frac{1}{N_S} \sum_{t=-\frac{N_S-1}{2},\ldots,\frac{N_S-1}{2}} Y'(i_t, j_t) \quad (32)$$

$$i_t = i + t \cos \theta'_{i,j}, j_t = j + t \sin \theta'_{i,j} \quad (33)$$

In Formula (32), $N_S$ denotes the number of pieces of data (i.e., the number of pixels in the shadow map) used for the smoothing. The larger this number is, the more strongly the shadow map is smoothed. In this modification, the value of $N_S$ is set according to the hair texture change degree $\alpha_Q$. For example, if $\alpha_Q=0$, then $N_S=1$. In this case, $Y_S(i,j)=Y'(i,j)$, and the shadow map does not change before and after the adjustment. Further, the larger the hair texture change degree $\alpha_Q$ is, the larger the value set to $N_S$ is. In this way, the larger the set hair texture change degree $\alpha_Q$ is, the more strongly the shadow map is smoothed. Note that if $i_t$, $j_t$ are not integers, $Y'(i_t,j_t)$ in Formula (32) can be obtained by interpolation using the neighboring pixels.

Then, the reflected light calculating unit 906 can correct the reflected light components calculated as above, using the shadow map. For example, for each pixel (i,j) in the input image, the reflected light calculating unit 906 can multiply the reflected light component $\rho_S(i,j)$ with the pixel value $Y_S(i,j)$ in the smoothed shadow map. Such a configuration allows the reflected light components to be corrected according to the shadows in the hair flow. In this example, the shadow map is adjusted according to the hair texture change degree, and therefore, fine shadows adjusted according to the hair texture change degree can be added to the reflected light components. As described above, the larger the hair texture change degree $\alpha_Q$ is, the more strongly the shadows along the hair flow are smoothed. In this case, the reflected light components along the hair flow become closer to being even, and therefore a clearer gloss can be added to the hair of the subject.

Not all the corrections described above need to be performed, but in a case where reflected light components are corrected using the reliabilities and the adjusted shadow map, a corrected reflected light component $\rho_S'(i,j)$ can be calculated for each pixel (i,j) in the input image in accordance with Formula (34). In this case, the image correcting unit can generate corrected image data using the corrected reflected light components $\rho_S'(i,j)$ instead of the reflected light components $\rho_S(i,j)$.

$$\rho_S'(i,j) = Y_S(i,j) F_R(i,j) \rho_S(i,j) \tag{34}$$

Embodiment 3

A digital image captured by image capturing using an image capturing apparatus or the like contains noise. Noise reduction processing is known to be performed on images to reduce such noise. In conventional noise reduction processing, high frequency components, e.g., representations of individual hairs on the head, may be lost in the process of the processing. Then, the user may get the impression that the sharpness of the image has been decreased by the noise reduction processing. To address this, an image processing apparatus of Embodiment 3 corrects an image obtained by performing noise reduction processing on an input image, by using a high frequency emphasized image in which high frequency components in the input image are emphasized. In Embodiment 3 in particular, processing is performed such that the pixel value of each pixel in the high frequency emphasized image is restricted within a range suitable for the brightness of the subject at the each pixel. Such a configuration allows noise in an image to be reduced while reducing degradation in the sharpness of the image.

The image processing apparatus according to the present embodiment is implementable by a hardware configuration similar to that of Embodiment 1, and may have the hardware configuration shown in FIG. 1 or 2.

Figure 17:
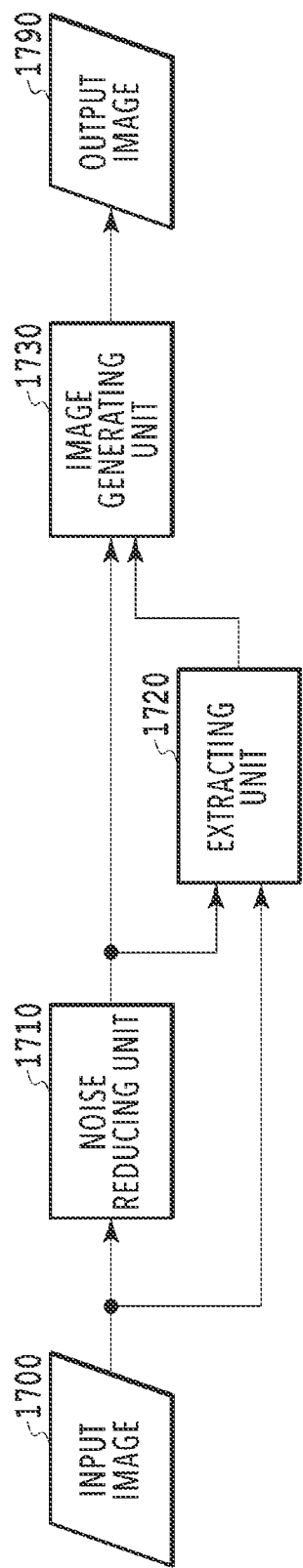
FIG. 17 is a diagram showing an example functional configuration of an image processing apparatus according to one embodiment.

FIG. 17 is a block diagram illustrating an example logical configuration of the image processing apparatus according to the present embodiment. The image processing apparatus according to the present embodiment includes a noise reducing unit 1710, an extracting unit 1720, and an image generating unit 1730.

The noise reducing unit 1710 obtains an input image 1700 and generates a noise reduced image in which noise in the input image 1700 has been reduced. In the present embodiment, the input image 1700 is an image in which a plurality of types of pixels each indicating color information of a type different from the rest are arranged on a single plane, and is, specifically, an image in RAW format. An image in RAW format is a single-plane image. A plane denotes the number of types of information each pixel has. In a single-plane image, each pixel has one type of information, and in a three-plane image, each pixel has three types of information. For example, an RGB image is a three-plane image, and an RGBα image is a four-plane image. In the present embodiment, the input image 1700 is a Bayer image, i.e., an image obtained using an image sensor with the Bayer arrangement. However, the input image 1700 is not limited to a Bayer image. Further, in the present embodiment, it is not essential that the input image 1700 be in RAW format.

The noise reduction processing performed by the noise reducing unit 1710 to reduce noise is not limited to any particular method. For example, the method described in Japanese Patent Laid-Open No. 2013-026669 (Patent Literature 2) may be employed. In the present embodiment, the noise reducing unit 1710 performs noise reduction processing using the following method. First, the noise reducing unit 1710 sets, as patches of interest, regions each consisting of a plurality of pixels in the input image 1700, and for each of these patches of interest, generates a group of similar patches that are similar to the each patch of interest. Next, the noise reducing unit 1710 calculates the average value of the pixels in the group of similar patches, and calculates a covariance matrix by finding the sum of the product of any two pixel values in each similar patch for the entire group of similar patches. The noise reducing unit 1710 obtains an eigenvalue and an eigenvector from the average value and the covariance matrix. Then, based on the eigenvalue and the eigenvector, the noise reducing unit 1710 generates a basis matrix corresponding to the similar patch group. Based on the basis matrix and the average value of the pixels, the noise reducing unit 1710 performs projection processing on the similar patches, thus performing noise reduction on the similar patches to obtain a group of noise reduced patches. Then, the noise reducing unit 1710 generates a noise reduced image by combining the group of noise reduced patches. Such combining processing is called, for example, aggregation. Specifically, the noise reducing unit 1710 can perform the combining processing by returning each of the group of noise reduced patches back to the original patch positions in the input image, and for the pixels where two or more patches overlap, obtaining a weighted average based on their average or similarity.

The extracting unit 1720 generates a high frequency emphasized image in which high frequency components in the input image 1700 are emphasized. This high frequency emphasized image can contain edge components, which are likely to be lost by noise reduction processing, and may contain some noise components. Thus, the high frequency emphasized image can be called an edge noise mixed image. In the present embodiment, the extracting unit 1720 extracts the high frequency emphasized image based on the input image 1700 and the noise-reduced image.

Figure 18A:
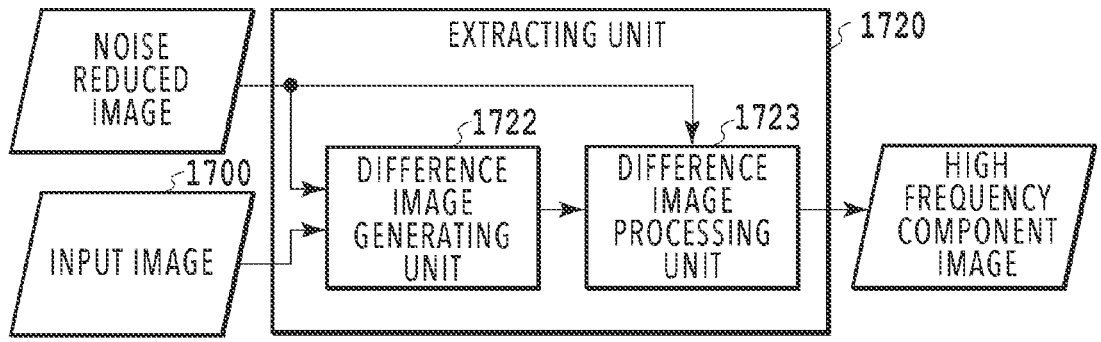
FIG. 18A is a diagram showing an example functional configuration of an image processing apparatus according to one embodiment.

The extracting unit 1720 according to the present embodiment includes, as shown in FIG. 18A, a difference image generating unit 1722 and a difference image processing unit 1723.

The difference image generating unit 1722 generates a difference image between the input image 1700 and the noise reduced image. The difference image generating unit 1722 can obtain the difference image by subtracting the pixel values of the pixels in the noise reduced image from the pixel values of the pixels in the input image 1700 at the same pixel positions. A difference image represents the differences between the input image 1700 and an image obtained by performing noise reduction processing on the input image 1700. Since noise reduction processing diminishes high frequency components (edge components and noise components), the difference image represents the high frequency components (edge components and noise components) in the input image 1700. The difference image thus obtained is a high frequency emphasized image in which the high frequency components in the input image 1700 are emphasized. Such a high frequency emphasized image containing edge components is used to correct the noise reduced image as will be described below, and then, the output image obtained by the correction can have an improved sharpness.

For each pixel in the high frequency emphasized image, the difference image processing unit 1723 performs processing to restrict the pixel value of the each pixel within a range suitable for the brightness of the subject at the each pixel. In a case where image capturing is performed using a sensor, noise dependent on the amount of light is superimposed on the captured image. Thus, at a bright part with a large amount of noise, the difference image may be contaminated with noise with a large amplitude. The difference image processing unit 1723 has a capability of dealing with such noise dependent on the brightness of the subject.

Figure 18B:
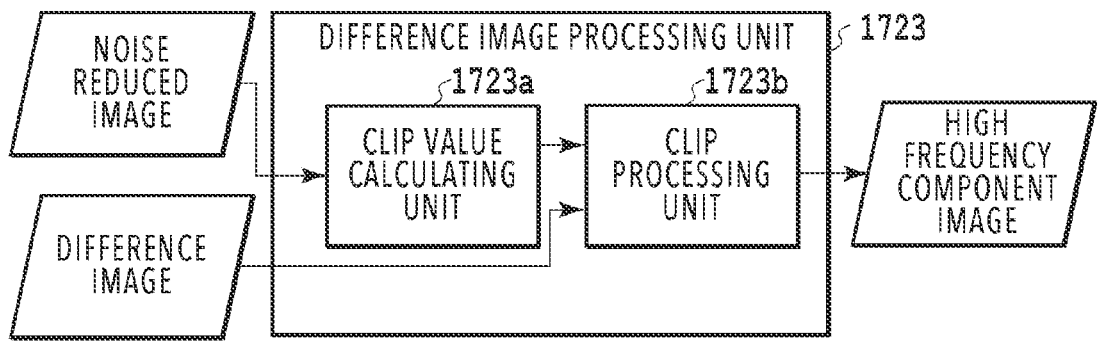
FIG. 18B is a diagram showing an example functional configuration of an image processing apparatus according to one embodiment.

The difference image processing unit 1723 has, as shown in FIG. 18B, a clip value calculating unit 1723a and a clip processing unit 1723b. The clip value calculating unit 1723a calculates a clip value ClipValue suitable for the brightness of the subject. As described above, the amount of noise is thought to depend on the amount of light incident on the sensor, i.e., the brightness of the subject. The brightness of the subject can be obtained by referencing to the noise reduced image or the input image 1700. In the present embodiment, the clip value calculating unit 1723a can obtain the clip values ClipValue to apply to the respective pixels in the difference image by applying Formulae (35) and (36) to the pixel values I of the corresponding pixels in the noise reduced image.

$$\sigma = \sqrt{(K \times (I - I0))} \quad (35)$$

$$ClipValue = R \times \sigma \quad (36)$$

In Formula (35), K and I0 denote the noise characteristics of the sensor used to capture the input image 1700. These parameters indicative of noise characteristics can be estimated beforehand by conducting such work (processing) as capturing an image of a chart for noise evaluation and analyzing the captured image. In Formula (35), σ denotes a noise standard deviation for each pixel. In Formula (36), R denotes a parameter for adjusting the clip value and can be determined beforehand.

The clip processing unit 1723b performs, for each pixel of the high frequency emphasized image, processing to restrict the pixel value within a range suitable for the brightness of the subject at that pixel. Although a specific method for the pixel value restriction is not limited to any particular method, the clip processing unit 1723b can, for example, change the pixel value of each pixel of the high frequency emphasized image to the upper limit value or the lower limit value of a range suitable for the brightness of the subject at that pixel if the pixel value is outside the range. In the present embodiment, the clip processing unit 1723b obtains a clipped image dc by clipping the difference image based on the clip values ClipValue obtained by the clip value calculating unit 1723a. The clipped image thus obtained, too, is a high frequency emphasized image in which the high frequency components in the input image 1700 are emphasized. In the present embodiment, the clipped image dc thus obtained is inputted to the image generating unit 1730 as a high frequency component image. The clip processing unit 1723b can perform the processing in accordance with Formula (37), where d denotes a pixel value in the difference image.

$$dc = \begin{cases} -ClipValue & d < -ClipValue \\ d & -ClipValue \le d \le ClipValue \\ ClipValue & ClipValue < d \end{cases} \quad (37)$$

In this way, the clip processing unit 1723b performs nonlinear processing to restrict each pixel value in the clipped image within a range from −ClipValue to +ClipValue defined according to the brightness of the subject. Such a configuration can reduce noise with a large amplitude outside this range and thereby can help prevent dotted noise (salt-and-pepper noise) from occurring after the high frequency emphasized image is added to the noise reduced image. Above all, the present embodiment can effectively reduce noise in a dark region by making this range smaller as the subject is darker.

Figure 18C:
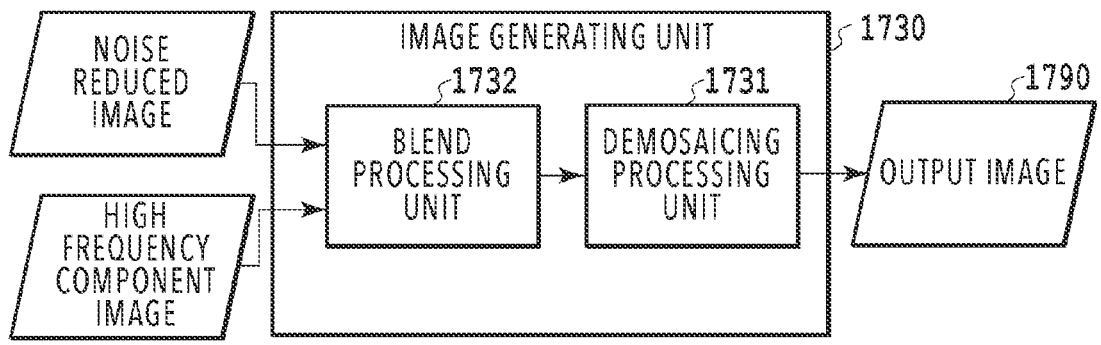
FIG. 18C is a diagram showing an example functional configuration of an image processing apparatus according to one embodiment.

The image generating unit 1730 generates an output image based on the noise reduced image and the high frequency emphasized image obtained by the processing by the difference image processing unit 1723. The image generating unit 1730 includes, as shown in FIG. 18C, a blend processing unit 1732. The image generating unit 1730 may also include a demosaicing processing unit 1731.

The blend processing unit 1732 corrects the noise reduced image using the high frequency component image. In one embodiment, the blend processing unit 1732 can add the high frequency component image and the noise reduced image together to generate a blended image, which is a corrected noise reduced image.

Figure 18D:
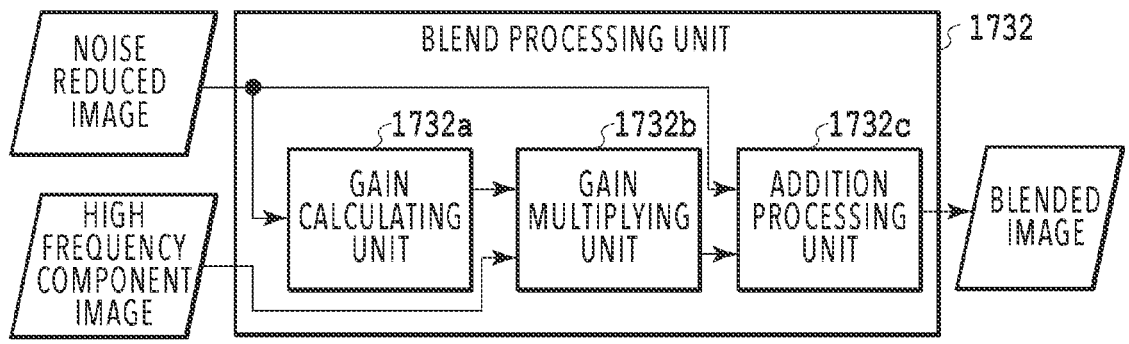
FIG. 18D is a diagram showing an example functional configuration of an image processing apparatus according to one embodiment.

In the present embodiment, the blend processing unit 1732 multiplies the high frequency component image with gain values suitable for the brightness of the subject, and then adds the resultant high frequency component image to the noise reduced image. In the present embodiment, the blend processing unit 1732 includes, as shown in FIG. 18D, a gain calculating unit 1732a, a gain multiplying unit 1732b, and an addition processing unit 1732c.

The gain calculating unit 1732a determines the brightness of the subject at each pixel. The brightness of the subject can be obtained by referencing to the noise reduced image or the input image 1700. Then, the gain calculating unit 1732a calculates a gain value for each pixel based on the thus-determined brightness of the subject at the pixel. In the present embodiment, the gain calculating unit 1732a can calculate a gain value for each pixel by obtaining the luminance value of the corresponding pixel in the noise reduced image as the brightness of the subject at that pixel, and calculating a gain value for the pixel based on the luminance value. The gain value is determined for each pixel such that the higher the brightness of the subject, the smaller the gain value, and the lower the brightness, the larger the gain value. For example, the gain value may be preset for each pixel value in the noise reduced image.

The gain multiplying unit 1732b corrects the high frequency component image using the gain values calculated by the gain calculating unit 1732a. Specifically, the gain multiplying unit 1732b can multiply the pixel value of each pixel in the high frequency component image with a gain value corresponding to the pixel. In other words, in the present embodiment, a larger gain is used for a darker portion of the subject in the high frequency component image.

Note that the gain multiplying unit 1732b may use other types of gain set for each pixel. For example, a gain value may be a coefficient determined beforehand, a coefficient dependent on the image height, or a coefficient dependent on the pixel value.

The addition processing unit 1732c generates a blended image by adding the high frequency component image corrected by the gain multiplying unit 1732b to the noise reduced image. In a natural image, an image of a dark subject tends to be low in contrast. It is not easy to perform noise reduction processing on an image with low contrast, and thorough noise reduction processing tends to result in significant degradation in the sharpness of the image. By adding a high frequency component image corrected with gains suitable for the brightness of the subject to a noise reduced image like in the present embodiment, high frequency components of a darker subject can be restored more intensely to improve the sharpness.

The above-described processing can improve the sharpness of a noise reduced image. The image generating unit 1730 may output, as an output image, a blended image obtained by the blend processing unit 1732 correcting a noise reduced image. In this case, the demosaicing processing unit 1731 is unnecessary. However, in a case where the input image is, for example, in RAW format, the demosaicing processing unit 1731 may perform demosaicing processing on the blended image. In this case, the image generating unit 1730 can output the demosaiced image obtained by the demosaicing processing as an output image.

The demosaicing processing unit 1731 performs demosaicing processing on a blended image, which is a noise reduced image after being corrected by the blend processing unit 1732. The demosaicing processing is processing to convert an image with a single plane into a demosaiced image with a plurality of planes each representing one type of color information. For example, the demosaicing processing unit 1731 can convert an image in RAW format into a YUV image, an L*a*b* image, an RGB image, a YMCK image, or the like.

The following describes a specific processing example of a case where the demosaicing processing unit 1731 converts a blended image in RAW format to a blended image in YUV format. As described earlier, the input image 1700 is a Bayer image, and therefore the blended image is a Bayer image as well. For a pixel of interest, the demosaicing processing unit 1731 determines the colors other than the color of the pixel of interest by linear interpolation using neighboring eight pixels. For instance, in a case where the pixel of interest is red (R), green (G) and blue (B) need to be interpolated. To interpolate G, linear interpolation is performed using four G pixels on the top of, below, to the right of, and to the left of the pixel of interest. To interpolate B, linear interpolation is performed using four B pixels which are the upper right, the lower right, the upper left, and the lower left of the pixel of interest. As a result of such linear interpolation, RGB pixel values are obtained for the pixel of interest, and thus an RGB image is generated. The demosaicing processing unit 1731 converts the RGB image thus obtained into a YUV image. This conversion can be carried out by multiplying the pixel values of each pixel with coefficients in accordance with Formulae (38) to (40).

$$Y = 0.2126 \times R + 0.7152 \times G + 0.0722 \times B \quad (38)$$

$$U = -0.114572 \times R - 0.385428 \times G + 0.5 \times B \quad (39)$$

$$V = 0.5 \times R - 0.454153 \times G - 0.045847 \times B \quad (40)$$

Figure 19:
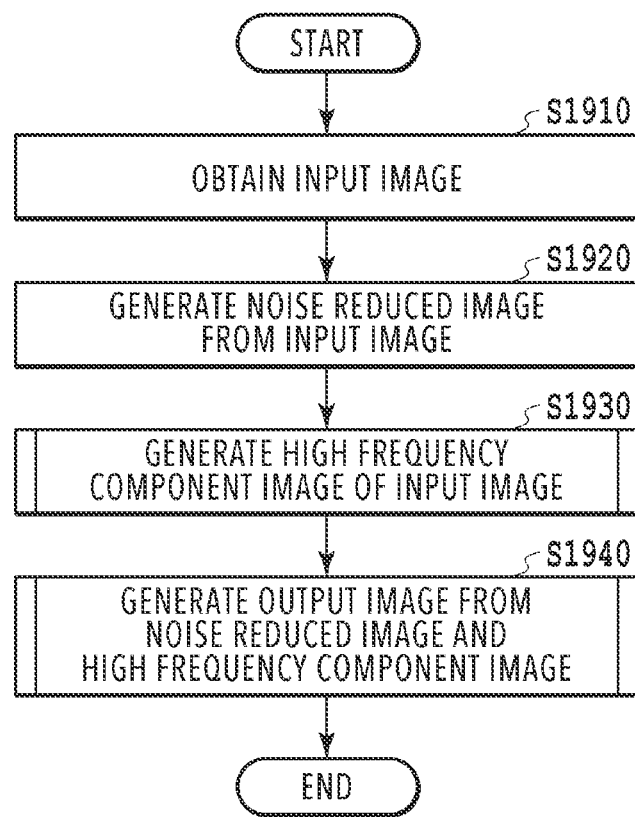
FIG. 19 is a flowchart of an image processing method according to one embodiment.

With reference to the flowcharts in FIGS. 19, 20A, and 20B, the following describes the flow of an image processing method according to the present embodiment. In S1910, the noise reducing unit 1710 reads the input image 1700. In S1920, the noise reducing unit 1710 obtains a noise reduced image by reducing noise in the input image 1700 as described earlier.

In S1930, the extracting unit 1720 generates a high frequency emphasized image in which high frequency components in the input image 1700 are emphasized, as described earlier. FIG. 20A shows a detailed flow of the processing in S1930. In S1931, the difference image generating unit 1722 obtains a difference image as described earlier based on the input image 1700 and the noise reduced image. In S1932, the clip value calculating unit 1723a calculates clip values as described earlier based on the noise reduced image. In S1933, the clip processing unit 1723b obtains a high frequency component image as described earlier by performing clip processing on the difference image based on the clip values.

In S1940, the image generating unit 1730 obtains an output image from the noise reduced image and the high frequency component image. FIG. 20B shows a detailed flow of the processing in S1940. In S1941, the gain calculating unit 1732a calculates gain values as described earlier based on the noise reduced image. In S1942, the gain multiplying unit 1732b multiplies the high frequency component image with the gain values as described earlier. In S1943, the addition processing unit 1732c obtains a blended image as described earlier by adding the noise reduced image to the high frequency component image which has been multiplied with the gain values. In S1944, the demosaicing processing unit 1731 obtains an output image by performing demosaicing processing on the blended image.

As described above, in the present embodiment, a noise reduced image is corrected using a high frequency component image in which the ratio of the edge components is relatively improved by clip processing, and consequently, noise can be reduced with the sharpness of the input image maintained. Further, even in a case where noise with a different standard deviation for each pixel is superimposed, favorable image quality can be achieved by performing clipping based on an assumed amount of noise.

Note that in the present embodiment, the difference image processing unit 1723 deals with noise dependent on the brightness of the subject by performing, for each pixel in the high frequency emphasized image, the processing to restrict each pixel value within a range suitable for the brightness of the subject at that pixel. Further, the blend processing unit 1732 deals with degradation in the sharpness of an image according to the brightness of the subject by multiplying the high frequency component image with gain values suitable for the brightness of the subject. However, it is not essential to employ both of these. Further, it is possible to employ a different method to correct each pixel in a high frequency emphasized image according to the brightness of the subject at that pixel. In such a case, nonlinear processing may be employed to improve the sharpness and aesthetics of an output image.

Embodiment 4

In Embodiment 4, a high frequency emphasized image is blended with a demosaiced image obtained by demosaicing an image in RAW format. Although high frequency components may be lost by the interpolation performed in the demosaicing processing, such a configuration can increase the high frequency content in an output image, compared to a case where the demosaicing processing is performed on an image to which high frequency components are added. Further, in Embodiment 4, processing is performed to raise the ratio of the edge components in the high frequency emphasized image. In a case where a majority of noise has been removed by noise reduction processing, the edge components in the high frequency emphasized image would be small relative to the noise. However, raising the ratio of the edge components in the high frequency emphasized image can increase the rate of improvement in the sharpness of the output image. Nonetheless, it is not essential to employ both of these.

The configuration of an image processing apparatus according to Embodiment 4 is similar to that of Embodiment 3, but the processing and configurations of the extracting unit 1720 and the image generating unit 1730 are different. The following mainly describes the differences from Embodiment 3, and may omit descriptions for the parts shared with Embodiment 3.

In the present embodiment, the extracting unit 1720 includes, as shown in FIG. 21A, a smoothing processing unit 1721 in addition to the difference image generating unit 1722 and the difference image processing unit 1723. The smoothing processing unit 1721 performs smoothing processing on a noise reduced image. For example, the smoothing processing unit 1721 can smooth a noise reduced image by filtering. Alternatively, the smoothing processing unit 1721 may perform the smoothing processing using different methods, such as two-dimensional Fourier transform—high frequency masking—two-dimensional inverse Fourier transform. Here, the smoothing processing unit 1721 may adaptively diminish edge components or texture components by performing nonlinear processing that diminishes high frequency components using a range filter, a bilateral filter, or the like.

Figure 22A:
FIG. 22A is a diagram illustrating example smoothing processing.
Figure 22B:
FIG. 22B is a diagram illustrating example smoothing processing.
Figure 22C:
FIG. 22C is a diagram illustrating example smoothing processing.

The following describes a specific example of processing performed by the smoothing processing unit 1721. The smoothing processing unit 1721 sets a pixel of interest (i,j) in a noise reduced image, and obtains a weighted average value A(i,j) in accordance with Formula (35) based on the pixel value of the pixel of interest and the pixels values of pixels which are in a 5×5 pixel range centered on the pixel of interest and which have the same color as the pixel of interest. In Formula (41), I(i,j) denotes the pixel value of the pixel (i,j). FIGS. 22A to 22C each show positional relations between a pixel of interest and pixels having the same color as the pixel of interest in a noise reduced image which is a Bayer image. FIGS. 22A, 22B, and 22C show cases where the pixel of interest is an R pixel, a G pixel, and a B pixel, respectively. By repeating this processing while sequentially setting all of the pixels in the noise reduced image to a pixel of interest, a smoothed image having the weighted average value A(i,j) at the pixel (i,j) is obtained.

$$A(i, j) = \frac{1}{N} \sum_m \sum_n \frac{I(i+m, j+n) * \frac{1}{2\pi\sigma} \exp\left(-\frac{[I(i, j) - I(i+m, j+n)]^2}{2\sigma^2}\right)}{\frac{1}{2\pi\sigma} \exp\left(-\frac{[I(i, j) - I(i+m, j+n)]^2}{2\sigma^2}\right)} \quad (41)$$

The difference image generating unit 1722 performs the same processing as that in Embodiment 3, except for generating a difference image between the input image 1700 and the noise reduced image which has undergone the smoothing processing. The difference image processing unit 1723 also performs the same processing as that in Embodiment 3. By thus performing smoothing processing on a noise reduced image, at least part of the edge components is reduced from the noise reduced image, and the edge components in the input image 1700 that the difference image has can therefore be increased. Thus, the ratio of edge components in the high frequency component image improves, which can in turn improve the sharpness of the output image.

In the present embodiment, the image generating unit 1730 includes, as shown in FIG. 21B, the demosaicing processing unit 1731 and a mixing processing unit 1733. The demosaicing processing unit 1731 performs the same processing as that in Embodiment 3, except for performing the demosaicing processing on a noise reduced image.

The mixing processing unit 1733 generates an output image by correcting the demosaiced image obtained by the demosaicing processing performed by the demosaicing processing unit 1731, using the high frequency emphasized image. Here, the mixing processing unit 1733 can perform a different correction for each of the planes of the demosaiced image. For example, the mixing processing unit 1733 can combine the high frequency emphasized image with each plane of the demosaiced image at a mixing ratio set for each plane. Here, the mixing ratios for some of the planes may be set to 0. Specifically, the mixing processing unit 1733 can selectively add a high frequency emphasized image to at least one plane selected from two or more planes of the demosaiced image, and does not have to add the high frequency emphasized image to the rest of the planes.

In the present embodiment, the mixing processing unit 1733 generates an output image by adding the high frequency component image only to the Y plane of the demosaiced image. No correction is performed on the U plane and the V plane. By thus adding the high frequency emphasized image only to the Y plane, noise can be reduced, and at the same time, the sharpness can be maintained favorably. Considering the visual characteristics of a human, adverse effects that the presence of noise components have on the aesthetics are small for the Y plane, which represents luminance information, and large for the U and V planes, which represent color difference information. Meanwhile, the favorable effects that signal sharpness (having many edge components) have on the aesthetics are large for the Y plane and small for the U and V planes. For these reasons, by adding the high frequency emphasized image containing edge components and noise components only to the Y plane, the favorable effects that the edge components have on the image can be increased while reducing the adverse effects that noise components have on the image.

Incidentally, because of the difference in sensitivity between RGB pixels, a high frequency component image may have a bright and dark check pattern in accordance with the Bayer arrangement. For this reason, the mixing processing unit 1733 can correct each pixel in a high frequency emphasized image such as a high frequency component image according to the type of the pixel and then correct a demosaiced image using the high frequency emphasized image. As already mentioned, the input image is in RAW format in the present embodiment. Each pixel in an image in RAW format is classified into one of a plurality of types (e.g., R, G, or B), and the pixel values of pixels of different types are obtained by image-capturing pixels having different spectral sensitivity characteristics from each other (e.g., R, G, and B). Thus, the mixing processing unit 1733 can correct a high frequency component image by multiplying the pixel value of each pixel in the high frequency component image with a gain value set for the pixel. In the present embodiment, different gain values are used for the R pixel, the G pixel, and the B pixel. For example, as gain values, white balance coefficients for the respective R, G, and B pixels can be used. By thus correcting a high frequency component image, a dark and bright pattern in accordance with the Bayer arrangement can be reduced. Alternatively, the mixing processing unit 1733 may multiply the pixel value of each pixel in the high frequency component image with both a gain value calculated in a similar manner to the gain calculating unit 1732a of Embodiment 1 and the above-described gain value set for each pixel.

Figure 23:
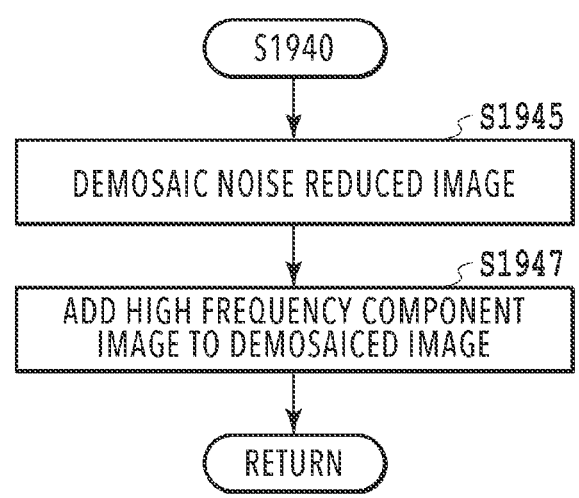
FIG. 23 is a flowchart of an image processing method according to one embodiment.

The following describes the flow of an image processing method according to the present embodiment, with reference to the flowcharts in FIGS. 19, 20A, 20B, and 23. The processing in S1910, S1920, S1932, and S1933 are the same as that in Embodiment 3. In S1931, the smoothing processing unit 1721 performs smoothing processing on a noise reduced image as described earlier, and the difference image generating unit 1722 generates a difference image by subtracting the smoothed noise reduced image from the input image 1700. In S1940, the image generating unit 1730 obtains an output image by using the noise reduced image and the high frequency component image. FIG. 23 shows a detailed flow of the processing in S1940 in the present embodiment. In S1946, the demosaicing processing unit 1731 obtains a demosaiced image by performing demosaicing processing on the noise reduced image as described earlier. In S1947, the mixing processing unit 1733 obtains an output image by correcting the Y plane of the demosaiced image using the high frequency component image as described earlier. By thus correcting the demosaiced image using the high frequency component image, the sharpness of the output image can be improved.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The technique of the present disclosure can add a natural gloss to an image according to the hair flow of the subject. Further, the technique of the present disclosure can reduce noise in an image while reducing degradation in the sharpness of the image.

This application claims the benefit of Japanese Patent Applications No. 2019-201585 filed Nov. 6, 2019, No. 2019-206348 filed Nov. 14, 2019 and No. 2019-211710 filed Nov. 22, 2019, which are hereby incorporated by reference wherein in their entirety.

What is claimed is:

1. An image processing apparatus comprising:
one or more processors; and
one or more memories, including instructions stored thereon, which when executed by the one or more processors cause the image processing apparatus to:
obtain image data obtained by capturing an image of a subject, and
add, based on the image data, gloss of different intensity in a first region where a flow direction of fibers of the subject is uniform and a second region where a flow direction of the fibers is not uniform and add a curved gloss to the subject according to each flow directions of the fibers.

2. The image processing apparatus according to claim 1, wherein the instructions when executed further cause the image processing apparatus to:
control an image capturing device,
wherein the image data is obtained by the image capturing device capturing the subject.

3. The image processing apparatus according to claim 1, wherein the instructions when executed further cause the image processing apparatus to:
obtain the image data by capturing the subject illuminated.

4. The image processing apparatus according to claim 1, wherein the instructions when executed further cause the image processing apparatus to:
control a display device capable of displaying live view.

5. The image processing apparatus according to claim 1, wherein the instructions when executed further cause the image processing apparatus to:
derive a degree of alignment of the flow directions of the fibers,
wherein a gloss is added to the subject corresponding to the derived
degree of alignment.

6. The image processing apparatus according to claim 5, wherein the instructions when executed further cause the image processing apparatus to:
derive the degree of alignment corresponding to a pixel of interest based on a pixel value of the pixel of interest and pixel values of pixels in the neighborhood of the pixel of interest.

7. The image processing apparatus according to claim 5, wherein the instructions when executed further cause the image processing apparatus to:
add a gloss to the subject in a case where a representative value of the degree of alignment is greater than or equal to a predetermined threshold value.

8. The image processing apparatus according to claim 7, wherein the instructions when executed further cause the image processing apparatus to:
derive the representative value of the degree of alignment for each subject and adds a gloss to only the subject for which the representative value of the degree of alignment is greater than or equal to the predetermined threshold value.

9. The image processing apparatus according to claim 5, wherein the instructions when executed further cause the image processing apparatus to:
add a stronger gloss to the subject based on how high the degree of alignment is.

10. The image processing apparatus according to claim 5, wherein the instructions when executed further cause the image processing apparatus to:
  derive angles of the flow directions of the fiber relative to a given direction based on brightness gradient in the image data and derives the degree of alignment based on the angle.

11. An image processing apparatus comprising:
  one or more processors; and
  one or more memories, including instructions stored thereon, which when executed by the one or more processors cause the image processing apparatus to:
    obtain image data obtained by capturing an image of a subject; and
    add a first gloss to a region in the obtained image data where the flow direction of the fibers of the subject is a first direction and add a second gloss different from the first gloss to a region in the obtained image data where a flow direction of the fibers is a second direction different from the first direction.

12. The image processing apparatus according to claim 11, wherein the instructions when executed further cause the image processing apparatus to:
  derive a degree of alignment of the flow directions of the fibers,
  wherein a gloss is added to the subject corresponding to the derived degree of alignment.

13. The image processing apparatus according to claim 11, wherein the instructions when executed further cause the image processing apparatus to:
  add a stronger gloss to the subject based on how high the degree of alignment is.

14. An image processing method comprising:
  obtaining image data obtained by capturing an image of a subject, and
  adding, based on the image data, gloss of different intensity in a first region where a flow direction of fibers of the subject is uniform and a second region where a flow direction of the fibers is not uniform and adding a curved gloss to the subject according to each flow directions of the fibers.

15. A non-transitory computer-readable storage medium storing instructions that, when executed by a computer, cause the computer to perform an image processing method, the image processing method comprising steps of:
  obtaining image data obtained by capturing an image of a subject, and
  adding, based on the image data, gloss of different intensity in a first region where a flow direction of fibers of the subject is uniform and a second region where a flow direction of the fibers is not uniform and adding a curved gloss to the subject according to each flow directions of the fibers.

16. An image processing method comprising:
  obtaining image data obtained by capturing an image of a subject,
  adding a first gloss to a region in the obtained image data where the flow direction of the fibers of the subject is a first direction and add a second gloss different from the first gloss to a region in the obtained image data where a flow direction of the fibers is a second direction different from the first direction.

17. A non-transitory computer-readable storage medium storing instructions that, when executed by a computer, cause the computer to perform an image processing method, the image processing method comprising steps of:
  obtaining image data obtained by capturing an image of a subject,
  adding a first gloss to a region in the obtained image data where the flow direction of the fibers of the subject is a first direction and add a second gloss different from the first gloss to a region in the obtained image data where a flow direction of the fibers is a second direction different from the first direction.

\* \* \* \* \*